(12) United States Patent
Hayakawa et al.

(10) Patent No.: US 7,780,193 B2
(45) Date of Patent: Aug. 24, 2010

(54) GAS GENERATOR

(75) Inventors: Shinichi Hayakawa, Nishikasugai-gun (JP); Shougo Matono, Himeji (JP)

(73) Assignees: Toyoda Gosei Co., Ltd., Nishikasugai-gun (JP); Nippon Kayaku Kabushiki Kaisha, Tokyo (JP)

( * ) Notice: Subject to any disclaimer, the term of this patent is extended or adjusted under 35 U.S.C. 154(b) by 133 days.

(21) Appl. No.: 12/088,578

(22) PCT Filed: Sep. 29, 2006

(86) PCT No.: PCT/JP2006/319437
§ 371 (c)(1),
(2), (4) Date: Mar. 28, 2008

(87) PCT Pub. No.: WO2007/037360
PCT Pub. Date: Apr. 5, 2007

(65) Prior Publication Data
US 2009/0230664 A1    Sep. 17, 2009

(30) Foreign Application Priority Data
Sep. 30, 2005   (JP) .............................. 2005-288262

(51) Int. Cl.
*B60R 21/26* (2006.01)
(52) U.S. Cl. .................................................... 280/741
(58) Field of Classification Search .................. 280/736, 280/740, 741, 742
See application file for complete search history.

(56) References Cited

U.S. PATENT DOCUMENTS

| | | | | |
|---|---|---|---|---|
| 4,437,681 A | * | 3/1984 | Adams et al. | ................ 280/733 |
| 5,058,921 A | * | 10/1991 | Cuevas | ........................ 280/741 |
| 5,533,751 A | | 7/1996 | Kort et al. | |
| 5,611,566 A | | 3/1997 | Simon et al. | |

(Continued)

FOREIGN PATENT DOCUMENTS

DE    39 07 089 A1    9/1990

(Continued)

OTHER PUBLICATIONS

U.S. Appl. No. 12/088,246, filed Mar. 27, 2008, Hayakawa, et al.

*Primary Examiner*—Faye M. Fleming
(74) *Attorney, Agent, or Firm*—Oblon, Spivak, McClelland, Maier & Neustadt, L.L.P.

(57) ABSTRACT

A gas generator (1A) comprising: an ignition chamber (13) in which an igniter (12) and an enhancer agent (14) stored therein; a first combustion chamber (23) and a second combustion chamber (33) in which gas generating agent (24, 34) stored therein respectively; a first transfer path (15) communicating the ignition chamber (13) with the first combustion chamber (23); and a second transfer path (16) communicating the ignition chamber (13) with the second combustion chamber (33). The first transfer path (15) and second transfer path (16) are disposed to be displaced in parallel such that a center line (15a) of the first transfer path (15) and a center line (16a) of the second transfer path (16) do not overlap on the same straight line. Because of such a configuration, in a gas generator having two or more gas output portions driven by one igniter, it becomes possible that an effect of combustion of a gas generating agent in each combustion chamber is substantially or completely independent.

16 Claims, 22 Drawing Sheets

U.S. PATENT DOCUMENTS

| | | | |
|---|---|---|---|
| 5,624,134 | A | 4/1997 | Iwai et al. |
| 6,095,561 | A | 8/2000 | Siddiqui et al. |
| 6,289,820 | B1 | 9/2001 | Anacker et al. |
| 6,598,901 | B2 | 7/2003 | Nakashima et al. |
| 6,644,206 | B2 | 11/2003 | Fogle, Jr. |
| 6,871,873 | B2 * | 3/2005 | Quioc et al. ................ 280/741 |
| 7,367,584 | B2 * | 5/2008 | Blackburn ................ 280/736 |
| 2003/0034641 | A1 | 2/2003 | Zimbrich et al. |
| 2003/0062713 | A1 | 4/2003 | Young et al. |
| 2003/0193178 | A1 | 10/2003 | Takahara |
| 2005/0115453 | A1 | 6/2005 | Takahara et al. |
| 2005/0206144 | A1 | 9/2005 | Numoto et al. |
| 2005/0230949 | A1 * | 10/2005 | Blackburn ................ 280/736 |
| 2008/0217895 | A1 * | 9/2008 | Hayakawa et al. .......... 280/741 |

FOREIGN PATENT DOCUMENTS

| | | |
|---|---|---|
| EP | 0 291 817 | 11/1998 |
| EP | 1 944 203 | 7/2008 |
| JP | 8 26064 | 1/1996 |
| JP | 2000 135964 | 5/2000 |
| JP | 2001 506562 | 5/2001 |
| JP | 2003-287400 | 10/2003 |
| JP | 2003-306120 | 10/2003 |
| JP | 2004 168309 | 6/2004 |
| JP | 2005 239020 | 9/2005 |
| JP | 2005 329783 | 12/2005 |
| WO | WO 2005/102790 A2 | 11/2005 |
| WO | WO 2005/102790 A3 | 11/2005 |

* cited by examiner

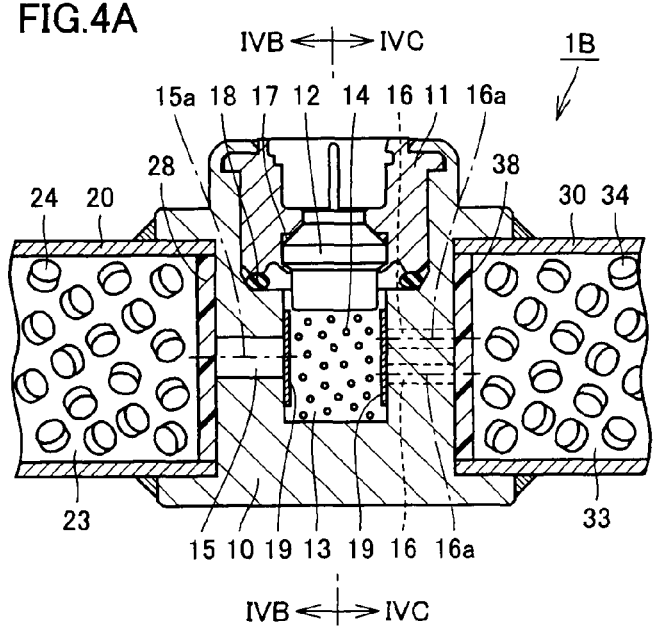
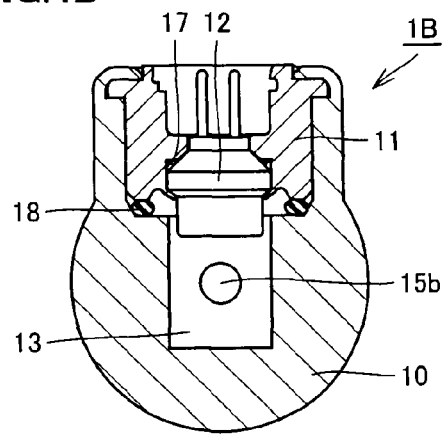
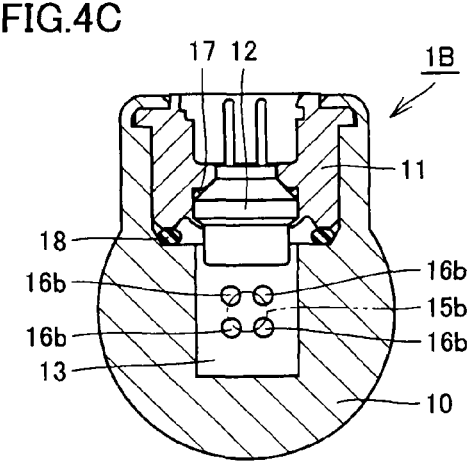

GAS GENERATOR

TECHNICAL FIELD

The present invention relates to a gas generator incorporated in a vehicle occupant protection apparatus mounted on an automobile or the like.

BACKGROUND ART

Conventionally, an air bag apparatus which is a vehicle occupant protection apparatus is widely used in view of protection of occupants of automobiles or the like. The airbag apparatus is provided for the purpose of protecting a vehicle occupant from shock caused by crash of a vehicle or the like. The airbag is instantaneously inflated and expanded at a time of crash of a vehicle or the like to serve as a cushion receiving the body of a vehicle occupant. A gas generator is equipment incorporated in this airbag apparatus to instantaneously generate gas at a time of crash of a vehicle or the like and inflate and expand the airbag.

Airbag apparatuses include a variety of constructions depending on the mounting positions on vehicles or parts of the body to be protected. For example, as for the airbag apparatus mounted on automobiles, a driver's airbag installed in front of the driver seat, a passenger's airbag installed in front of the passenger seat, a so-called side airbag or curtain airbag installed on a side of the driver seat or passenger seat, and the like are known. Therefore, gas generators incorporated in airbag apparatuses include a variety of constructions, and the most suitable construction is selected depending on specifications.

One of a variety of constructions of gas generators is a so-called T-shaped gas generator having a cylindrical housing with closed opposite ends and discharging gas from the opposite end portions. In the T-shaped gas generator, an ignition chamber in which an igniter and enhancer agent are stored is provided in the central position of the cylindrical housing, a pair of combustion chambers in which a gas generating agent is stored are provided on the opposite end portions of the cylindrical housing, between which the ignition chamber is sandwiched, and respective gas discharge openings in communication with the respective combustion chambers are separately provided. In this T-shaped gas generator, two gas output portions generating and outputting gas can be provided independently. Moreover, these two gas output portions can be driven by one igniter. The documents disclosing the T-shaped gas generator include, for example, Japanese Patent Laying-Open No. 8-26064 (Patent Document 1).

FIG. 23 is a cross-sectional view of a conventional T-shaped gas generator disclosed in the aforementioned Patent Document 1. As shown in FIG. 23, in a conventional T-shaped gas generator 101, a base member 110 and a support member 111 are arranged in the middle portion of a cylindrical housing 102 having opposite ends closed by closing members 141, 142. An igniter 112 and enhancer agent 114 are stored in an ignition chamber 113 defined by base member 110 and support member 111. On opposite outsides thereof, first and second combustion chambers 123, 133 in which gas generating agents 124, 134 are stored are respectively arranged such that ignition chamber 113 is sandwiched therebetween. On the further outsides thereof, first and second filter chambers in which filter members 125, 135 are stored are respectively arranged. Ignition chamber 113 in which enhancer agent 114 is stored and first and second combustion chambers 123, 133 in which gas generating agents 124, 134 are stored are communicated with each other respectively through a first transfer path 115 and a second transfer path 116 provided to base member 110. Then, gas discharge openings 122, 132 for discharging the generated gas are provided on the circumferential surface of housing 102 at the portions defining the first and second filter chambers, whereby gas output portions 121, 131 are provided at the opposite end portions of cylindrical housing 102.

In the aforementioned conventional T-shaped gas generator 101, igniter 112 is actuated at a time of vehicle crash to ignite and burn enhancer agent 114 in ignition chamber 113, and hot particles produced by combustion of enhancer agent 114 pass through first transfer path 115 and second transfer path 116 to respectively flow into first combustion chamber 123 and second combustion chamber 133, whereby gas generating agents 124, 134 stored in first combustion chamber 123 and second combustion chamber 133 are respectively fired and burned. The combustion of gas generating agents 124, 134 causes a large amount of gas to be generated in first and second combustion chambers 123, 133, and the generated gas respectively passes through filter members 125, 135 stored in the first filter chamber and the second filter chamber to be discharged to the outside of housing 102 from gas discharge openings 122, 132. Then, the gas discharged from housing 102 inflates and expands the airbag. Patent Document 1: Japanese Patent Laying-Open No. 8-26064

DISCLOSURE OF THE INVENTION

Problems to be Solved by the Invention

In the conventional T-shaped gas generator 101 disclosed in the aforementioned Patent Document 1, the opening face of first transfer path 115 and the opening face of second transfer path 116 provided on the wall surface of ignition chamber 113 are formed of holes having the same inner diameter and these opening faces are arranged to face each other. In addition, first transfer path 115 and second transfer path 116 are provided with ignition chamber 113 interposed therebetween such that their center lines overlap in the same straight line. In such a configuration, in operation of the gas generator, that is, in the state where the gas generating agent is fired by the enhancer agent ignited by the igniter, combustion of the gas generating agent in the first and second combustion chambers has a large effect on combustion of the gas generating agent in the respective other combustion chamber through the first and second transfer paths and the ignition chamber.

When uniform outputs in a pair of gas output portions provided at the opposite end portions of the cylindrical housing are desired, it is preferable that the first transfer path and the second transfer path are provided with the ignition chamber interposed therebetween such that their center lines overlap on the same straight line, as described above. Such a configuration allows combustion of the gas generating agent in the first and second combustion chambers to affect each other through the first and second transfer paths and the ignition chamber, so that a balance is achieved between the combustion states of the gas generating agents in the first and second combustion chambers, and the discharging speed and the discharging amount of gas discharged from a pair of gas output portions are balanced.

However, in a case where uniform outputs in a pair of gas output portions are not desired, (for example, a case where respective airbags are mounted, independently one for each, for a pair of gas output portions and they are intended to expand at different expansion speeds, a case where internal pressure difference between the aforementioned pair of airbags is intended, or a case where a single airbag is mounted on both of a pair of gas output portions, and the duration of the expanded airbag is intended to be prolonged by adjusting the duration of the gas output at the pair of gas output portions), it is not preferable that combustion of the gas generating agent in the first and second combustion chambers has a large effect on combustion of the gas generating agent in the respective other combustion chamber. This is because if combustion of the gas generating agent in one combustion chamber has an effect on combustion of the gas generating agent in the other combustion chamber, the combustion characteristics of the gas generating agent in each combustion chamber will be different from the intended ones and, in such a case, the desired performance cannot be obtained for the airbag apparatus as a whole.

The present invention is therefore made to solve the aforementioned problem, and an object of the present invention is to provide a gas generator having two or more gas output portions driven by one igniter, in which an effect of combustion of a gas generating agent in each combustion chamber on combustion of a gas generating agent in the other combustion chamber is restrained or prevented so that the outputs in the respective gas output portions are substantially or completely independent of each other.

Means for Solving the Problems

A gas generator based on the present invention includes an ignition chamber, a first combustion chamber, a second combustion chamber, a first transfer path, a second transfer path, and restraint means. The first transfer path is provided to communicate the ignition chamber with the first combustion chamber, and the second transfer path is provided to communicate the ignition chamber with the second combustion chamber. A single igniter and an enhancer agent are stored in the ignition chamber. A gas generating agent is stored in each of the first combustion chamber and the second combustion chamber. The restraint means restrains combustion of the gas generating agent stored in the first combustion chamber from having an effect on combustion of the gas generating agent stored in the second combustion chamber through the first transfer path, the ignition chamber and the second transfer path, when the gas generating agent is fired by the enhancer agent ignited by the igniter.

Here, "the effect of combustion" includes an effect caused by a pressure variation as a result of a pressure difference between combustion chambers, an effect caused by movement of hot particles, and the like. In actuality, combustion in a combustion chamber under high pressure and combustion in a combustion chamber under low pressure interfere with each other, and in this sense, they affect each other and are affected by each other. However, the language "to have an effect" used in the present description is used, in particular, from the standpoint that combustion in a combustion chamber under high pressure has an effect on combustion in a combustion chamber under low pressure. Furthermore, "to restrain an effect" not only includes to reduce an effect but also includes to completely eliminate an effect.

Because of such a configuration, it is restrained or prevented by the restraint means that combustion of the gas generating agent stored in the first combustion chamber has an effect on combustion of the gas generating agent stored in the second combustion chamber through the first transfer path, the ignition chamber and the second transfer path. Therefore, it becomes possible that the combustion characteristics of the gas generating agent in the first combustion chamber and the combustion characteristics of the gas generating agent in the second combustion chamber are substantially or completely independent of each other, so that the intended combustion characteristics of the gas generating agent can be obtained in each combustion chamber and the desired output can be obtained in each gas output portion.

In the gas generator based on the present invention as described above, the ignition chamber, the first combustion chamber and the second combustion chamber may be provided inside an elongated housing, and in such a case, preferably, the ignition chamber, the first combustion chamber and the second combustion chamber are arranged linearly in an axial direction of the elongated housing such that the ignition chamber is sandwiched between the first combustion chamber and the second combustion chamber.

When the first combustion chamber, the ignition chamber and the second combustion chamber are arranged linearly in this manner, the first combustion chamber and the second combustion chamber are positioned to face each other with the ignition chamber interposed therebetween, so that combustion of the gas generating agent in the first combustion chamber is more likely to have an effect on combustion of the gas generating agent in the second combustion chamber through the first transfer path, the ignition chamber and the second transfer path. Therefore, when restraint means is provided in a gas generator having such a configuration, this restraint means functions particularly effectively, and it becomes possible that the combustion characteristics of the gas generating agent in the first combustion chamber and the combustion characteristics of the gas generating agent in the second combustion chamber are substantially or completely independent of each other. Thus, the intended combustion characteristics can be obtained in each combustion chamber and the desired output can be obtained in each gas output portion.

In the gas generator based on the present invention as described above, as the restraint means, preferably, the first transfer path and the second transfer path are arranged to be displaced from each other in parallel such that a center line of the first transfer path and a center line of the second transfer path do not overlap on a same straight line.

In the gas generator based on the present invention as described above, as the restraint means, preferably, the first transfer path and the second transfer path are arranged to be displaced from each other such that a center line of the first transfer path and a center line of the second transfer path are non-parallel.

In the gas generator based on the present invention as described above, as the restraint means, preferably, the first transfer path and the second transfer path are arranged to be displaced from each other such that when an opening face of the first transfer path provided on a wall surface of the ignition chamber is projected onto a wall surface of the ignition chamber on which an opening face of the second transfer path is provided, along a center line of the first transfer path, the projected opening face of the first transfer path does not overlap with the opening face of the second transfer path.

Here, "center line of the transfer path" is a line connecting center points in the cross sections of the transfer path which are orthogonal to the direction in which the transfer path extends. When the transfer path is formed of a hole extending linearly, the center line is also a straight line. When the transfer path is formed of a hole extending like a curve, the center line is also a curved line. It is noted that the center line of the transfer path generally overlaps with the travel direction of gas or hot particles flowing through the transfer path.

When the first combustion chamber, the ignition chamber and the second combustion chamber are arranged linearly, with any one of the aforementioned configurations, the path comprised of the first transfer path, the ignition chamber and the second transfer path positioned between the first combustion chamber and the second combustion chamber becomes complicated as compared with a case where the first transfer path and the second transfer path are provided such that their center lines overlap on the same straight line with the ignition chamber interposed therebetween. Therefore, by employing any one of the aforementioned configurations, which function as restraint means, it is prevented that combustion of the gas generating agent stored in the first combustion chamber has an effect on combustion of the gas generating agent stored in the second combustion chamber. Accordingly, it becomes possible that the combustion characteristics of the gas generating agent in the first combustion chamber and the combustion characteristics of the gas generating agent in the second combustion chamber are substantially or completely independent of each other, so that the intended combustion characteristics of the gas generating agent can be obtained in each combustion chamber and the desired output can be obtained in each gas output portion.

In the gas generator based on the present invention as described above, as the restraint means, preferably, the first transfer path and the second transfer path are arranged to be displaced in an axial length of the igniter such that when an opening face of the first transfer path provided on a wall surface of the ignition chamber is projected onto a wall surface of the ignition chamber on which an opening face of the second transfer path is provided, along a center line of the first transfer path, the projected opening face of the first transfer path does not overlap with the opening face of the second transfer path, and, in addition, the ignition chamber is partitioned in the axial direction of the igniter into two chambers by providing a separation wall between the opening face of the first transfer path provided on a wall surface of the ignition chamber and the opening face of the second transfer path provided on a wall surface of the ignition chamber.

Here, "the axial direction of the igniter" means a direction that agrees with the main travel direction of hot particles discharged from the igniter when the igniter is actuated. Usually, in an igniter, the internal space in which ignition charge is stored is formed like an approximate cylinder, and thus "the axial direction of the igniter" means the axial direction of the internal space formed like an approximate cylinder.

Because of such a configuration, the path comprised of the first transfer path, the ignition chamber and the second transfer path positioned between the first combustion chamber and the second combustion chamber becomes complicated as compared with a case where the first transfer path and the second transfer path are provided such that their center lines overlap on the same straight line with the ignition chamber interposed therebetween. In addition, the opening face of the first transfer path and the opening face of the second transfer path provided on the wall surface of the ignition chamber are separated from each other by a separation wall which partitions the ignition chamber in the axial length of the igniter into two chambers, so that the ignition chamber can be complicated as compared with a configuration with one chamber. Therefore, the first transfer path and the second transfer path can be substantially incommunicable with each other. Accordingly, these function as restraint means so that an effect of combustion of the gas generating agent stored in the first combustion chamber on combustion of the gas generating agent stored in the second combustion chamber is restrained. As a result, it becomes possible that the combustion characteristics of the gas generating agent in the first combustion chamber and the combustion characteristics of the gas generating agent in the second combustion chamber are substantially independent of each other, so that the intended combustion characteristics of the gas generating agent can be obtained in each combustion chamber and the desired output can be obtained in each gas output portion.

In the gas generator based on the present invention as described above, preferably, the separation wall is formed of a part of a cylindrical cup with a bottom part arranged in the ignition chamber. In this case, the cup member may be press fitted and fixed in the ignition chamber.

Because of such a configuration, a separation wall can be provided easily by arranging a cup member in the ignition chamber. In addition, the ignition chamber can easily be partitioned into two chambers, namely, a chamber communicating the ignition chamber with the first transfer path and a chamber communicating the ignition chamber with the second transfer path.

In the gas generator based on the present invention as described above, as the restraint means, a separation wall is preferably provided between an opening face of the first transfer path provided on a wall surface of the ignition chamber and an opening face of the second transfer path provided on a wall surface of the ignition chamber.

Because of such a configuration, the opening face of the first transfer path and the opening face of the second transfer path provided on the wall surface of the ignition chamber are separated from each other by a separation wall, so that the first transfer path and the second transfer path can be substantially or completely incommunicable with each other. Accordingly, the separation wall functions as restraint means so that an effect of combustion of the gas generating agent stored in the first combustion chamber on combustion of the gas generating agent stored in the second combustion chamber is restrained or prevented. As a result, it becomes possible that the combustion characteristics of the gas generating agent in the first combustion chamber and the combustion characteristics of the gas generating agent in the second combustion chamber are substantially or completely independent of each other, so that the intended combustion characteristics of the gas generating agent can be obtained in each combustion chamber and the desired output can be obtained in each gas output portion.

In the gas generator based on the present invention as described above, as the restraint means, preferably, a check valve driven based on a pressure difference between the first combustion chamber and the second combustion chamber is disposed at a position that allows the first transfer path to be closed.

Because of such a configuration, in the state where the gas generating agent is burned in the first combustion chamber, the check valve is driven, based on the pressure difference between the first combustion chamber and the second combustion chamber, to close the first transfer path, so that the first combustion chamber and the second combustion chamber can be completely incommunicable with each other. Therefore, the check valve functions as restraint means so that an effect of combustion of the gas generating agent stored in the first combustion chamber on combustion of the gas generating agent stored in the second combustion chamber is prevented. Therefore, it becomes possible that the combustion characteristics of the gas generating agent in the first combustion chamber and the combustion characteristics of the gas generating agent in the second combustion chamber are completely independent of each other, so that the intended combustion characteristics of the gas generating agent can be obtained in each combustion chamber and the desired output can be obtained in each gas output portion.

In the gas generator based on the present invention as described above, the restraint means may be configured with a movable member movably arranged in the ignition chamber and a movement restriction member arranged in the ignition chamber and being in abutment with the movable member for restricting movement of the movable member. In this case, preferably, the movable member is moved against restriction of movement by the movement restriction member by a pressure produced in the ignition chamber, whereby at least one of an opening face of the first transfer path provided on a wall surface of the ignition chamber and an opening face of the second transfer path provided on a wall surface of the ignition chamber is closed by the movable member.

Because of such a configuration, the movable member restricted from moving by the movement restriction member is moved according to a pressure rise in the ignition chamber to close at least one of the opening face of the first transfer path and the opening face of the second transfer path, so that the first combustion chamber and the second combustion chamber can be completely incommunicable with each other. Therefore, these members function as restraint means so that an effect of combustion of the gas generating agent stored in the first combustion chamber on combustion of the gas generating agent stored in the second combustion chamber is prevented. Therefore, it becomes possible that the combustion characteristics of the gas generating agent in the first combustion chamber and the combustion characteristics of the gas generating agent in the second combustion chamber are completely independent of each other, so that the intended combustion characteristics of the gas generating agent can be obtained in each combustion chamber and the desired output can be obtained in each gas output portion.

In the gas generator based on the present invention as described above, the movable member is preferably formed of a cylindrical cup with a bottom part arranged in the ignition chamber.

Because of such a configuration, the cup member can be formed as a movable member easily by arranging the cup member in the ignition chamber.

In the gas generator based on the present invention as described above, the movement restriction member preferably has a fragile portion broken off with a movement of the movable member.

Because of such a configuration, the restriction of movement of the movable member by the movement restriction member can be released easily by breakage of the fragile portion.

EFFECTS OF THE INVENTION

In accordance with the present invention, in a gas generator having two or more gas output portions driven by one igniter, it becomes possible that an effect of combustion of a gas generating agent in each combustion chamber on combustion of a gas generating agent in the other combustion chamber is restrained or prevented. Therefore, the desired output can be obtained in each gas output portion, and an airbag apparatus stable in performance can be realized.

BRIEF DESCRIPTION OF THE DRAWINGS

FIG. 4A is an enlarged cross-sectional view of a main part in a first modification of the gas generator in the first embodiment of the present invention.

FIG. 4B is a cross-sectional view taken along line IVB-IVB in FIG. 4A.

FIG. 4C is a cross-sectional view taken along line IVC-IVC in FIG. 4A.

DESCRIPTION OF THE REFERENCE SIGNS 1A-1P gas generator, 10 base member, 11 support member, 12 igniter, 13 ignition chamber, 13a first ignition chamber, 13b second ignition chamber, 14 enhancer agent, 15 first transfer path, 15a center line, 15b opening face, 16 second transfer path, 16a center line, 16b opening face, 17, 18, 19 seal member, 20 first cylindrical member, 20a groove, 21 gas output portion, 22 gas discharge opening, 23 first combustion chamber, 23a space, 24 gas generating agent, 25 filter member, 26 partition plate, 27 communication hole, 28 cushion material, 29 seal member, 30 second cylindrical member, 30a groove, 31 gas output portion, 32 gas discharge opening, 33 second combustion chamber, 33a space, 34 gas generating agent, 35 filter member, 36 partition plate, 37 communication hole, 38 cushion material, 39 seal member, 41, 42 closing member, 50 separation wall, 51, 52 cup member, 51a, 51b, 52a-52c opening portion, 55 pin, 55a strut portion, 55b flange portion, 55c fragile portion, 60, 65 check valve, 61, 66 protrusion portion, 62, 67 through-hole, 70, 75 check valve, 72, 77 through-hole.

BEST MODES FOR CARRYING OUT THE INVENTION

In the following, embodiments of the present invention will be described in detail with reference to the figures. It is noted that in the embodiments illustrated below, description will be made to a case where the present invention is applied to a so-called T-shaped gas generator having an approximately cylindrical housing with opposite ends closed and discharging gas from these opposite end portions, by way of example.

First Embodiment

Figure 1A:
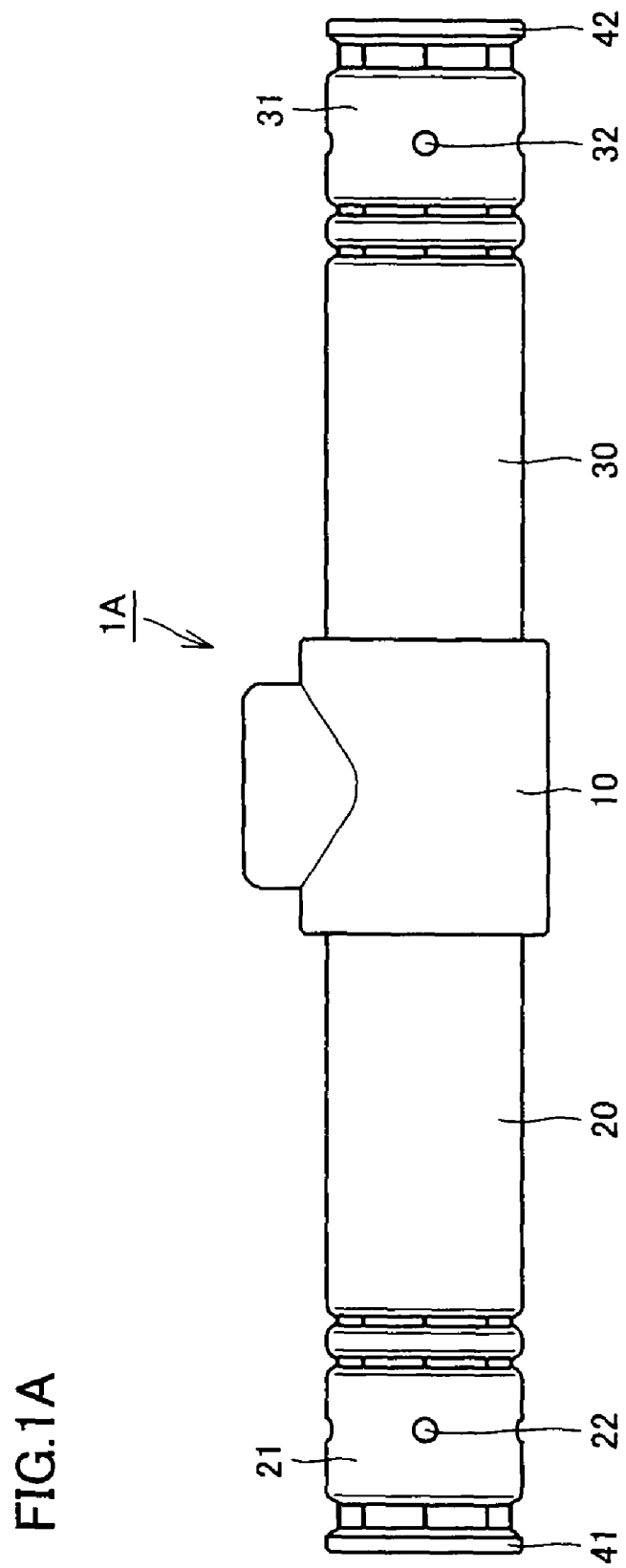
FIG. 1A is a front view showing an external structure of a gas generator in a first embodiment of the present invention.
Figure 1B:
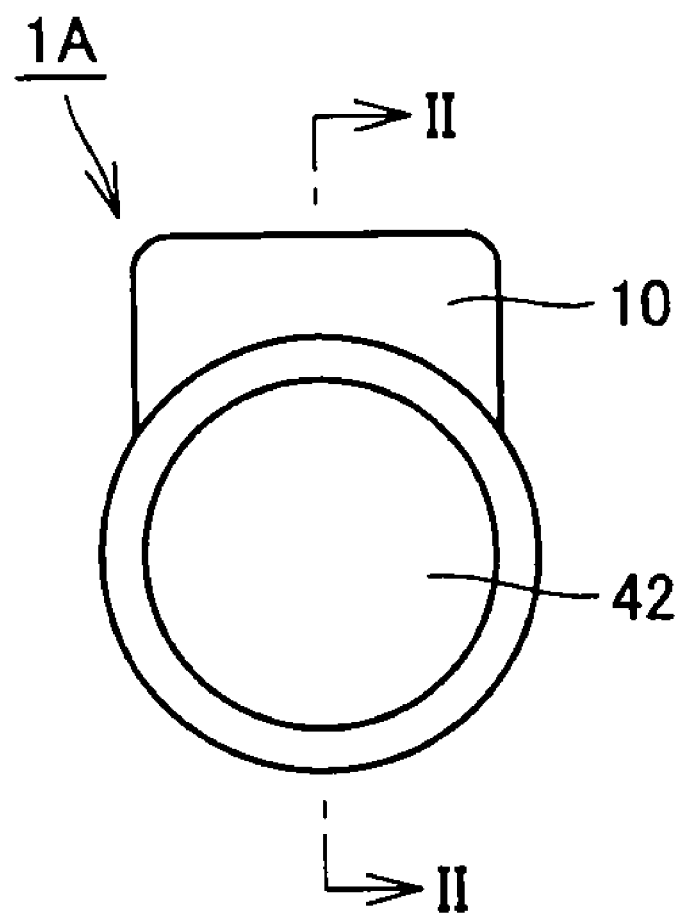
FIG. 1B is a right-side view showing an external structure of the gas generator in the first embodiment of the present invention.
Figure 2:
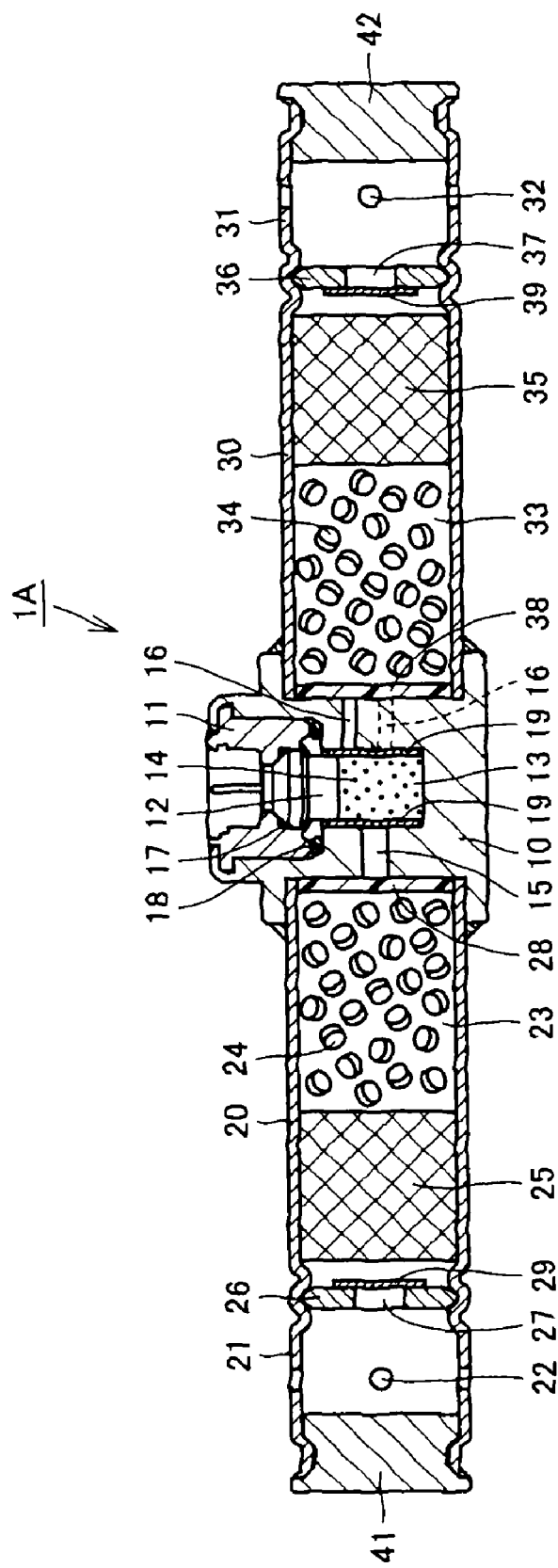
FIG. 2 is a view showing an internal structure of the gas generator in the first embodiment of the present invention and is a cross-sectional view taken along line II-II in FIG. 1B.

FIG. 1A and FIG. 1B are views showing an external structure of a gas generator in a first embodiment of the present invention, where FIG. 1A is a front view and FIG. 1B is a right-side view. FIG. 2 is a view showing an internal structure of the gas generator shown in FIG. 1A and FIG. 1B and is a cross-sectional view taken along line II-II in FIG. 1B. First, referring to these figures, an external structure and an internal structure of a gas generator 1A in the present embodiment will be described.

As shown in FIG. 1A and FIG. 1B, gas generator 1A in the present embodiment has an elongated, approximately cylindrical housing having an approximately cylindrical outer shape and includes a base member 10, a first cylindrical member 20 connected to one end portion of base member 10, a second cylindrical member 30 connected to the other end portion of base member 10, and closing members 41, 42 respectively closing the end portions of first cylindrical member 20 and second cylindrical member 30.

As shown in FIG. 2, at a prescribed position in the circumferential direction of base member 10, a depression portion is provided in a direction crossing the axial direction of the housing having an approximately cylindrical outer shape, and a support member 11 supporting an igniter (squib) 12 as described later is fitted in the depression portion. At a prescribed position in the axial direction of first cylindrical member 20, a partition plate 26 partitioning the internal space of first cylindrical member 20 in the axial direction is arranged, and at a prescribed position in the axial direction of second cylindrical member 30, a partition plate 36 partitioning the internal space of second cylindrical member 30 in the axial direction is arranged.

These base member 10, support member 11, first cylindrical member 20, second cylindrical member 30, partition plates 26, 36 and closing members 41, 42 are each formed of a member made of metal such as stainless steel, iron steel, aluminum alloy, or stainless steel alloy and are coupled and fixed by welding, caulking, and the like. Specifically, support member 11 is fixed by caulking in a state in which it is inserted in the depression portion of base member 10, and first cylindrical member 20 and second cylindrical member 30 are fixed to the end portions of base member 10 by welding. Furthermore, partition plate 36 and closing member 41 are both inserted and fitted in a hollow portion of first cylindrical member 20 and fixed by caulking the circumferential wall of first cylindrical member 20 inwardly, and partition plate 26 and closing member 42 are both inserted and fitted in a hollow portion of second cylindrical member 30 and fixed by caulking the circumferential wall of second cylindrical member 30 inwardly.

As shown in FIG. 1A, FIG. 1B, and FIG. 2, in the vicinity of the end portion of first cylindrical member 20 that is not fixed to base member 10, a gas discharge opening 22 is provided for discharging gas, and a gas output portion 21 is formed at this part. On the other hand, in the vicinity of the end portion of second cylindrical member 30 that is not fixed to base member 10, a gas discharge opening 32 is provided for discharging gas, similarly to first cylindrical member 20, and a gas output portion 31 is formed at this part.

As shown in FIG. 2, in the interior of the approximately cylindrical housing formed of base member 10, support member 11, first cylindrical member 20, second cylindrical member 30, partition plates 26, 36 and closing members 41, 42, provided are an ignition chamber 13 in which an igniter 12 and enhancer agent 14 are stored, a first combustion chamber 23 in which gas generating agent 24 and a filter member 25 are stored, a second combustion chamber 33 in which gas generating agent 34 and a filter member 35 are stored, a first transfer path 15 communicating ignition chamber 13 with first combustion chamber 23, and a second transfer path 16 communicating ignition chamber 13 with second combustion chamber 33. Gas generator 1A in the present embodiment has a symmetrical structure with respect to the approximately middle portion in the axial direction of the approximately cylindrical housing, and first combustion chamber 23 and first transfer path 15 are arranged in the left portion in the figure while second combustion chamber 33 and second transfer path 16 are arranged in the right portion in the figure. Therefore, ignition chamber 13, first combustion chamber 23 and second combustion chamber 33 are arranged to extend linearly.

Ignition chamber 13 is defined by base member 10 and support member 11 and is provided at the approximately middle portion in the axial direction of the approximately cylindrical housing. Single igniter 12 and enhancer agent 14 are stored in ignition chamber 13, as described above. Igniter 12 supported by support member 11 is arranged such that its header pin (input terminal) is exposed on the outer surface of gas generator 1A. A connector (not shown) for coupling igniter 12 with a collision detection sensor is connected to the header pin. On the wall surface of ignition chamber 13 having the opening face of first transfer path 15 formed thereon and the wall surface of ignition chamber 13 having the opening face of second transfer path 16 formed thereon, respective seal members 19 are affixed, and seal members 19 close the respective opening faces. For example, an aluminum foil coated with an adhesive member on either surface thereof is used as seal member 19. Accordingly, the airtightness between ignition chamber 13 and first transfer path 15 and second transfer path 16 is secured.

Igniter 12 is an ignition device for generating flame and includes a not-shown ignition charge and a not-shown resistor for burning the ignition charge, inside thereof. More specifically, igniter 12 includes a base member inserting and holding a pair of header pins and a squib cup attached on the base member. A resistor (bridge wire) is attached to couple the tip ends of the header pins inserted into the squib cup, and an ignition charge is packed in the squib cup in such a manner as to surround this resistor or to be in contact with the resistor. A nichrome wire or the like is generally used as a resistor, and ZPP (zirconium potassium perchlorate), ZWPP (zirconium tungsten potassium perchlorate), lead tricinate, or the like is generally used as an ignition charge. The squib cup is generally made of metal or plastic.

When collision is detected, a prescribed amount of current flows in the resistor through the header pin. As a result of a prescribed amount of current flowing in the resistor, Joule heat is generated in the resistor and the ignition charge starts burning. High-temperature flame produced by combustion explodes the squib cup storing the ignition charge. The time from current flowing in the resistor to actuation of igniter 12 is two milliseconds or shorter when a nichrome wire is used for the resistor.

A seal member 17 is interposed between igniter 12 and support member 11. Seal member 17 hermetically seals the gap between igniter 12 and support member 11 to enclose ignition chamber 13 and is inserted in the above-noted gap when igniter 12 is fixed to support member 11 by caulking. A seal member 18 is also interposed between base member 10 and support member 11. Seal member 18 hermetically seals the gap between base member 10 and support member 11 to enclose ignition chamber 13 and is inserted in the above-noted gap when support member 11 is fixed to base member 10 by caulking.

As seal members 17, 18, those formed of a material having sufficient heat resistance and durability are preferably used, and for example, an O-ring made of EPDM resin which is a kind of ethylene propylene rubber is suitably used. Here, a liquid seal agent may additionally be coated at the portions where these seal members are introduced in order to further enhance the hermeticity of ignition chamber 13.

Enhancer agent 14 packed in ignition chamber 13 is ignited by the flame produced by actuation of igniter 12 and burned to generate hot particles. Enhancer agent 14 is required to allow gas generating agents 24, 34 to start burning reliably, and a composition made of metal powder/oxidant represented by B/KNO$_3$ or the like is generally used. As enhancer agent 14, powder, a mold formed in a prescribed shape by a binder, or the like is used. The shape of the enhancer agent molded by the binder includes a variety of shapes, for example, like granules, a column, a sheet, a ball, a cylinder with a single hole, a cylinder with multiple holes, a tablet, and the like.

First combustion chamber 23 is defined by first cylindrical member 20, base member 10 and partition plate 26 and is provided closer to one end of the approximately cylindrical housing (a part on the left side in the figure). Second combustion chamber 33 is defined by second cylindrical member 30, base member 10 and partition plate 36 and is provided closer to the other end of the approximately cylindrical housing (a part on the right side in the figure). Gas generating agents 24, 34 and filter members 25, 35 are respectively stored in first combustion chamber 23 and second combustion chamber 33, as described above. Gas generating agents 24, 34 are arranged in the respective spaces of first combustion chamber 23 and second combustion chamber 33 that face ignition chamber 13, and filter members 25, 35 are arranged adjacent to these gas generating agents 24, 34 in the respective spaces of first combustion chamber 23 and second combustion chamber 33 that face partition plates 26, 36.

Gas generating agents 24, 34 are fired by hot particles produced by combustion of enhancer agent 14 ignited by igniter 12 and burned to generate gas. Gas generating agents 24, 34 are generally formed as molded bodies including a fuel, an oxidant and an additive. As a fuel, for example, a triazol derivative, a tetrazol derivative, a guanidine derivative, an azodicarbonamide derivative, a hydrazine derivative, or the like or a combination thereof is used. Specifically, for example, nitroguanidine, guanidine nitrate, cyanoguanidine, 5-aminotetrazol, or the like is suitably used. Furthermore, as an oxidant, for example, nitrate or the like including cation selected from alkali metal, alkaline-earth metal, transition metal, ammonia is used. As a nitrate, for example, sodium nitrate, potassium nitrate, or the like is suitably used. Furthermore, an additive includes a binder, a slag forming agent, a combustion adjusting agent, and the like. As a binder, for example, an organic binder such as a metal salt of carboxymethyl cellulose or stearic acid salt, or an inorganic binder such as synthetic hydroxytalcite or acid clay can suitably be used. As a slag forming agent, silicon nitride, silica, acid clay, or the like can suitably be used. As a combustion adjustment agent, a metal oxide, ferrosilicon, activated carbon, graphite or the like can suitably be used.

The shape of the molded body of gas generating agents 24, 34 includes a variety of shapes like granules, pellets, a column, a disk, and the like. A holed molded body having a hole in the interior of the molded body (for example, a tubular shape with a single hole or a tubular shape with multiple holes) is also used. These shapes are preferably selected as appropriate depending on the specifications of the airbag apparatus having gas generator 1A incorporated therein. An optimum shape is preferably selected according to the specifications, for example, such a shape is selected that allows the gas generation speed to change over time during combustion of gas generating agents 24, 34. In addition to the shape of gas generating agents 24, 34, the size and the packed amount of the molded body are preferably selected as appropriate in consideration of the linear combustion rate, the pressure index of gas generating agents 24, 34, and the like.

In first combustion chamber 23 and second combustion chamber 33, cushion materials 28, 38 are arranged respectively in contact with the wall surface of base member 10 on which the opening face of first transfer path 15 and the opening face of second transfer path 16 are formed. These cushion materials 28, 38 are attached for the purpose of preventing gas generating agents 24, 34 formed of molded bodies from being crushed by vibration and the like, and a molded body of ceramic fiber, foamed silicon or the like is suitably used.

Filter members 25, 35 are formed, for example, by winding a wire material or a net material of a metal such as stainless steel or iron steel or compressing the same by presswork. Filter members 25, 35 function as cooling means for cooling gas by removing hot-temperature heat of the gas generated in first combustion chamber 23 and second combustion chamber 33 when the gas passes through filter members 25, 35, and also function as removal means for removing residue (slag) and the like included in the gas.

Communication holes 27, 37 are provided in partition plates 26, 36, respectively. Communication hole 27 communicates first combustion chamber 23 with gas discharge opening 22, and communication hole 37 communicates second combustion chamber 33 with gas discharge opening 32. On the main surface of partition plate 26 which is positioned to face first combustion chamber 23 and the main surface of partition plate 36 which is positioned to face second combustion chamber 23, seal members 29, 39 are affixed to close the aforementioned communication holes 27, 37, respectively. For these seal members 29, 39, an aluminum foil coated with an adhesive member on either surface thereof, or the like is used. Thus, the airtightness between first combustion chamber 23 and second combustion chamber 33 and the outside of the housing is secured.

The operation of the gas generator in the present embodiment will now be described. When a vehicle having gas generator 1A in the present embodiment mounted thereon collides, a collision detection means separately provided in the vehicle detects the collision, based on which igniter 12 is actuated. Enhancer agent 14 stored in ignition chamber 13 is ignited by flame produced by the actuation of igniter 12 and burns to generate a large amount of hot particles. The combustion of enhancer agent 14 raises the pressure in ignition chamber 13, which breaks off sealing of seal member 19 so that the hot particles pass through first transfer path 15 and second transfer path 16 to reach cushion materials 28, 38 arranged closer to base member 10 in first combustion chamber 23 and second combustion chamber 33. The hot particles that have reached cushion materials 28, 38 open up or split cushion materials 28, 38 by the heat whereby the hot particles flow into first combustion chamber 23 and second combustion chamber 33.

Gas generating agents 24, 34 stored in first combustion chamber 23 and second combustion chamber 33 are fired and burned by the flowing hot particles thereby generating a large amount of gas. The combustion of gas generating agents 24, 34 raises the pressure in first combustion chamber 23 and second combustion chamber 33, which breaks off the sealing of seal members 29, 39, so that the generated gas is sent to gas output portions 21, 31. Here, the gas passes through each of filter members 25, 35 to be cooled to a prescribed temperature, is discharged from each of gas discharge openings 22, 32 to the outside of the housing, and is thereafter introduced into the airbag to inflate and expand the airbag.

Figure 3A:
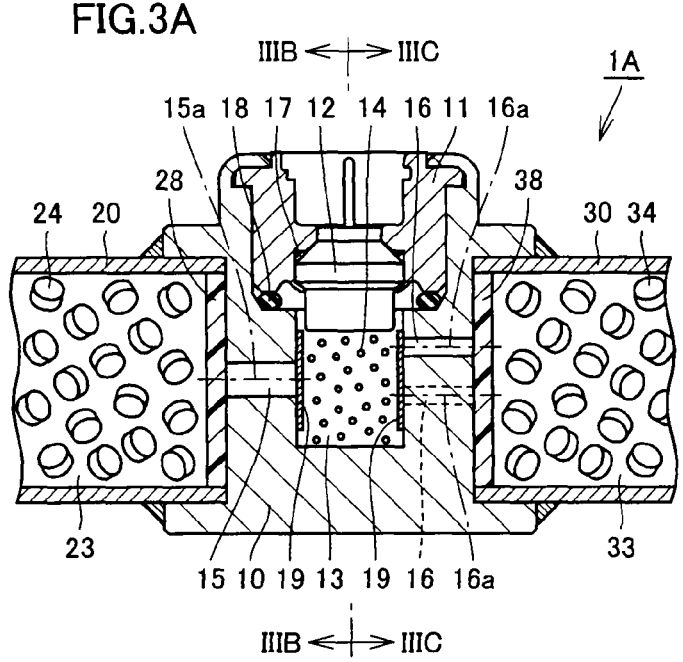
FIG. 3A is an enlarged cross-sectional view of a main part of the gas generator in the first embodiment of the present invention.
Figure 3B:
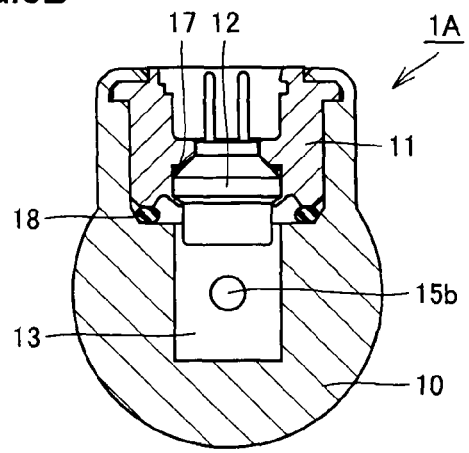
FIG. 3B is a cross-sectional view taken along line IIIB-IIIB in FIG. 3A.
Figure 3C:
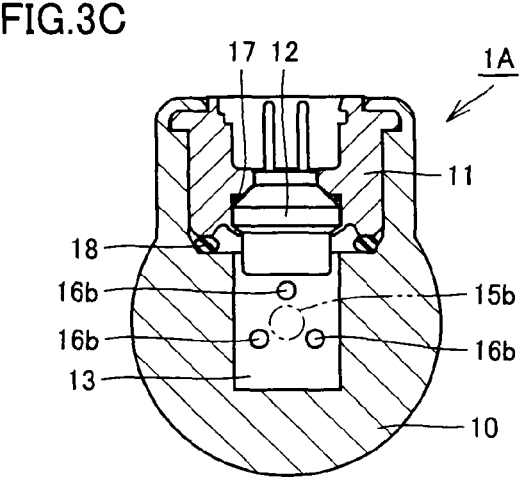
FIG. 3C is a cross-sectional view taken along line IIIC-IIIC in FIG. 3A.

FIG. 3A is an enlarged cross-sectional view of a main part of the gas generator in the present embodiment, FIG. 3B is a cross-sectional view taken along line IIIB-IIIB in FIG. 3A, and FIG. 3C is a cross sectional view taken along line IIIC-IIIC in FIG. 3A. It is noted that in FIG. 3B and FIG. 3C, the seal member affixed on the wall surface of the ignition chamber and the enhancer agent are not shown. In the following, restraint means provided for gas generator 1A in the present embodiment will be described in detail.

As shown in FIG. 3A to FIG. 3C, in gas generator 1A in the present embodiment, first transfer path 15 communicating ignition chamber 13 with first combustion chamber 23 is formed of one hole drilled in base member 10 to extend linearly. By contrast, second transfer path 16 communicating ignition chamber 13 with second combustion chamber 33 is formed of three holes drilled in base member 10 to extend linearly. Then, first transfer path 15 and second transfer path 16 are disposed to be displaced in parallel such that a center line 15a of the hole forming first transfer path 15 and a center line 16a of the hole forming second transfer path 16 do not overlap on the same straight line.

Because of such a configuration, a path comprised of first transfer path 15, ignition chamber 13 and second transfer path 16 positioned between first combustion chamber 23 and second combustion chamber 33 becomes complicated as compared with the case where first transfer path 15 and second transfer path 16 are provided such that their center lines overlap on the same straight line with ignition chamber 13 interposed therebetween. Therefore, such disposition of first transfer path 15 and second transfer path 16 functions as restraint means per se, so that in operation of gas generator 1A, that is, in the state where gas generating agents 24, 34 are fired by enhancer agent 14 ignited by igniter 12, an effect of the combustion of gas generating agent 24 stored in first combustion chamber 23 on the combustion of gas generating agent 34 stored in second combustion chamber 33 is restrained. More specifically, when a pressure difference occurs between first combustion chamber 23 and second combustion chamber 33, a backflow of generated gas caused by a pressure increase in first combustion chamber 23 produced by combustion of gas generating agent 24 in first combustion chamber 23 is prevented, and the resultant movement of hot particles from first combustion chamber 23 to second combustion chamber 33 is prevented. Therefore, it becomes possible that the combustion characteristics of gas generating agent 24 in first combustion chamber 23 and the combustion characteristics of gas generating agent 34 in second combustion chamber 33 are substantially independent of each other, so that the intended combustion characteristics of gas generating agents 24, 34 in the respective combustion chambers 23, 33 can be obtained, and desired outputs can be obtained in the respective gas output portions 21, 31.

In addition, in gas generator 1A in the present embodiment, first transfer path 15 and second transfer path 16 are disposed to be displaced from each other such that when an opening face 15b of first transfer path 15 provided on the wall surface of ignition chamber 13 is projected onto the wall surface of ignition chamber 13 on which an opening face 16b of second transfer path 16 is provided, along center line 15a of first transfer path 15, the projected opening face 15b of first transfer path 15 does not overlap with opening face 16b of second transfer path 16 (see, in particular, FIG. 3C). Therefore, the restraint effect is more outstanding.

As described above, in a case where uniform outputs in a pair of gas output portions are not desired, (for example, a case where respective airbags are mounted, independently one for each, for a pair of gas output portions and they are intended to expand at different expansion speeds, a case where internal pressure difference between the aforementioned pair of airbags is intended, or a case where a single airbag is mounted on both of a pair of gas output portions, and the duration of the expanded airbag is intended to be prolonged by adjusting the duration of the gas output at the pair of gas output portions), employment of the configuration of the gas generator as in the present embodiment eliminates a large effect of combustion of the gas generating agent in the first and second combustion chambers on combustion of the gas generating agent in the respective other combustion chamber, so that the desired performance can be obtained for the airbag apparatus as a whole.

In the following, modifications to the gas generator in the present embodiment will be described in order.

FIG. 4A is an enlarged cross-sectional view of a main part of a gas generator in accordance with a first modification of the present embodiment, FIG. 4B is a cross-sectional view taken along line IVB-IVB in FIG. 4A, and FIG. 4C is a cross-sectional view taken along line IVC-IVC in FIG. 4A. It is noted that in FIG. 4B and FIG. 4C, the seal member affixed on the wall surface of the ignition chamber and the enhancer agent are not shown.

As shown in FIG. 4A to FIG. 4C, in a gas generator 1B in accordance with the first modification of the present embodiment, first transfer path 15 is formed of one hole drilled in base member 10 to extend linearly, and second transfer path 16 is formed of four holes drilled in base member 10 to extend linearly. Then, first transfer path 15 and second transfer path 16 are disposed to be displaced from each other in parallel such that center line 15a of the hole forming first transfer path 15 and center line 16a of the hole forming second transfer path 16 do not overlap on the same straight line. Also in such a configuration, the path comprised of first transfer path 15, ignition chamber 13 and second transfer path 16 becomes complicated, so that the restraint effect can be achieved similarly to the above-noted gas generator 1A.

Here, in gas generator 1B in this modification, when opening face 15b of first transfer path 15 provided on the wall surface of ignition chamber 13 is projected onto the wall surface of ignition chamber 13 on which opening face 16b of second transfer path 16 is provided, along center line 15a of first transfer path 15, the projected opening face 15b of first transfer path 15 partially overlaps with opening face 16b of second transfer path 16. Also in such a configuration, complication of the path can be achieved as long as the entire opening face 15b of first transfer path 15 does not overlap with opening face 16b of second transfer path 16 after projection, and therefore the restraint effect can be obtained to some extent.

Figure 5A:
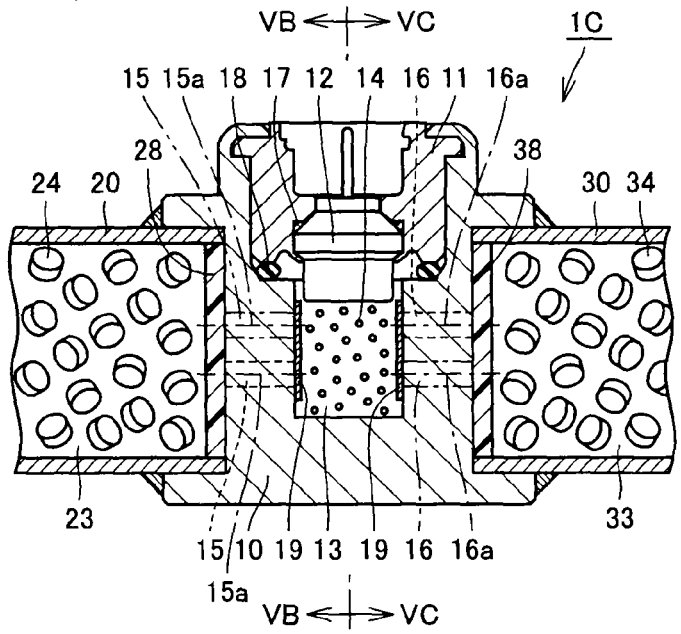
FIG. 5A is an enlarged cross-sectional view of a main part in a second modification of the gas generator in the first embodiment of the present invention.
Figure 5B:
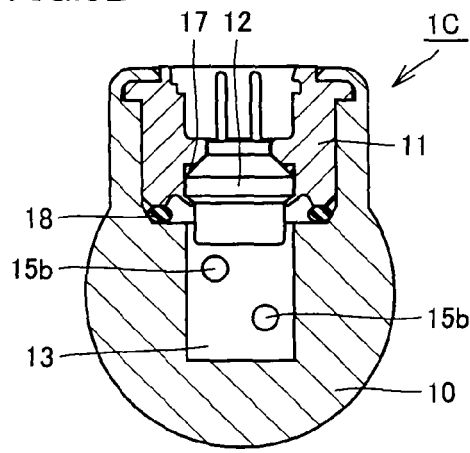
FIG. 5B is a cross-sectional view taken along line VB-VB in FIG. 5A.
Figure 5C:
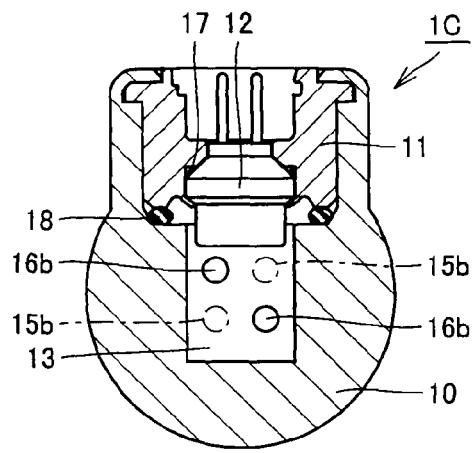
FIG. 5C is a cross-sectional view taken along line VC-VC in FIG. 5A.

FIG. 5A is an enlarged cross-sectional view of a main part of a gas generator in accordance with a second modification of the present embodiment, FIG. 5B is a cross-sectional view taken along line VB-VB in FIG. 5A, and FIG. 5C is a cross-sectional view taken along line VC-VC in FIG. 5A. It is noted that in FIG. 5B and FIG. 5C, the seal member affixed on the wall surface of the ignition chamber and the enhancer agent are not shown.

As shown in FIG. 5A to FIG. 5C, in a gas generator 1C in accordance with the second modification of the present embodiment, first transfer path 15 is formed of two holes drilled in base member 10 to extend linearly, and second transfer path 16 is formed of two holes drilled in base member 10 to extend linearly. Then, first transfer path 15 and second transfer path 16 are disposed to be displaced from each other in parallel such that they are respectively arranged at diagonal positions so that center line 15a of the hole forming first transfer path 15 and center line 16a of the hole forming second transfer path 16 do not overlap on the same straight line. Also in such a configuration, the path comprised of first transfer path 15, ignition chamber 13 and second transfer path 16 becomes complicated, so that the outstanding restraint effect can be achieved similarly to the above-noted gas generator 1A.

Figure 6A:
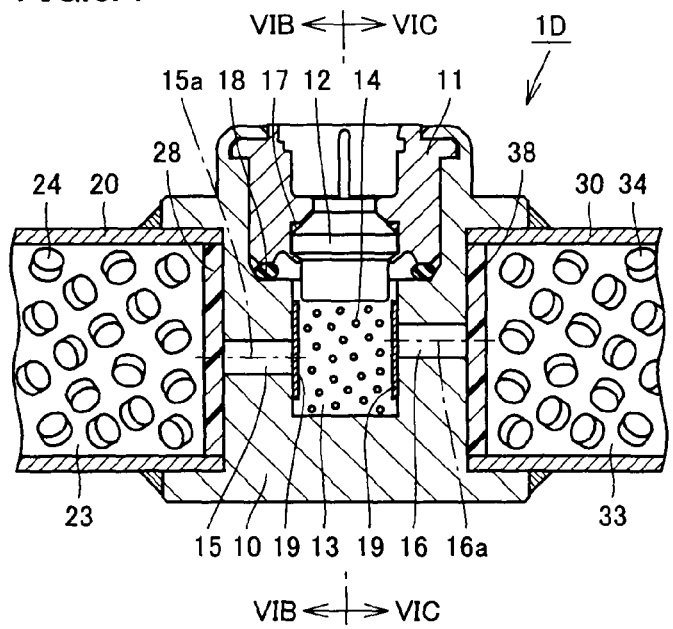
FIG. 6A is an enlarged cross-sectional view of a main part in a third modification of the gas generator in the first embodiment of the present invention.
Figure 6B:
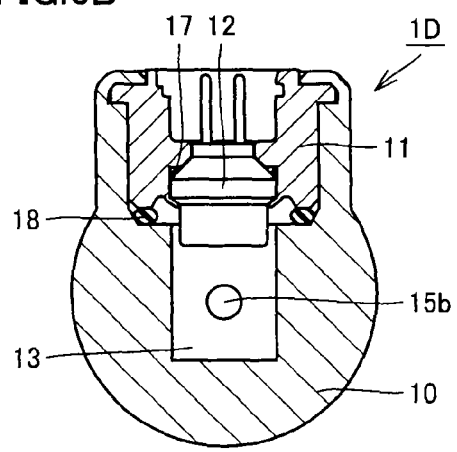
FIG. 6B is a cross-sectional view taken along line VIB-VIB in FIG. 6A.
Figure 6C:
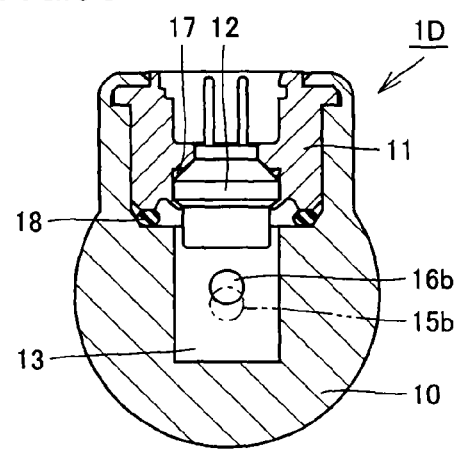
FIG. 6C is a cross-sectional view taken along line VIC-VIC in FIG. 6A.

FIG. 6A is an enlarged cross-sectional view of a main part of a gas generator in accordance with a third modification of the present embodiment, FIG. 6B is a cross-sectional view taken along line VIB-VIB in FIG. 6A, and FIG. 6C is a cross-sectional view taken along line VIC-VIC in FIG. 6A. It is noted that in FIG. 6B and FIG. 6C, the seal member affixed on the wall surface of the ignition chamber and the enhancer agent are not shown.

As shown in FIG. 6A to FIG. 6C, in a gas generator 1D in accordance with the third modification of the present embodiment, first transfer path 15 is formed of one hole drilled in base member 10 to extend linearly, and second transfer path 16 is formed of one hole drilled in base member 10 to extend linearly. Then, first transfer path 15 and second transfer path 16 are disposed to be displaced from each other in parallel such that center line 15a of the hole forming first transfer path 15 and center line 16a of the hole forming second transfer path 16 do not overlap on the same straight line. Also in such a configuration, the path comprised of first transfer path 15, ignition chamber 13 and second transfer path 16 becomes complicated, so that the restraint effect can be achieved similarly to the above-noted gas generator 1A.

Figure 7A:
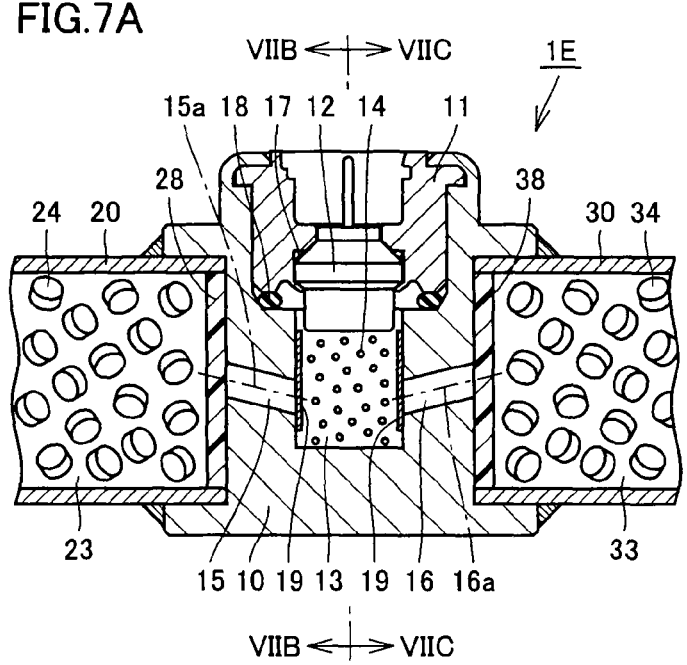
FIG. 7A is an enlarged cross-sectional view of a main part in a fourth modification of the gas generator in the first embodiment of the present invention.
Figure 7B:
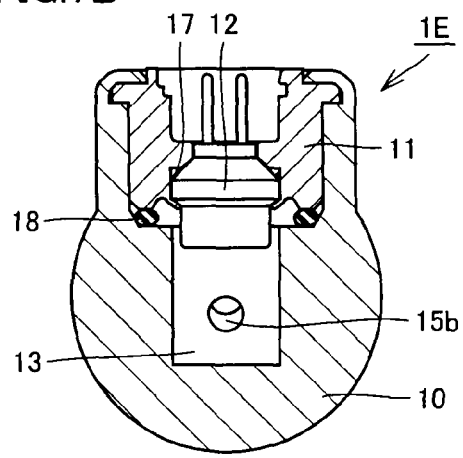
FIG. 7B is a cross-sectional view taken along line VIIB-VIIB in FIG. 7A.
Figure 7C:
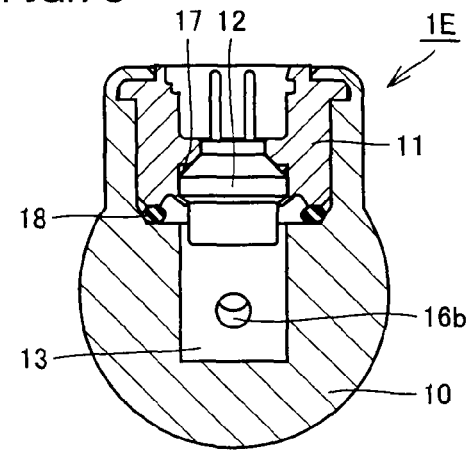
FIG. 7C is a cross-sectional view taken along line VIIC-VIIC in FIG. 7A.

FIG. 7A is an enlarged cross-sectional view of a main part of a gas generator in accordance with a fourth modification of the present embodiment, FIG. 7B is a cross-sectional view taken along line VIIB-VIIB in FIG. 7A, and FIG. 7C is a cross-sectional view taken along line VIIC-VIIC in FIG. 7A.

It is noted that in FIG. 7B and FIG. 7C, the seal member affixed on the wall surface of the ignition chamber and the enhancer agent are not shown.

As shown in FIG. 7A to FIG. 7C, in a gas generator 1E in accordance with the fourth modification of the present embodiment, first transfer path 15 is formed of one hole drilled in base member 10 to extend linearly, and second transfer path 16 is formed of one hole drilled in base member 10 to extend linearly. Then, first transfer path 15 and second transfer path 16 are disposed to be displaced from each other in non-parallel such that center line 15a of the hole forming first transfer path 15 and center line 16a of the hole forming second transfer path 16 do not overlap on the same straight line. Here, in gas generator 1E in accordance with the present modification, first transfer path 15 and second transfer path 16 are provided obliquely in different directions with respect to the axial line of the approximately cylindrical housing. Also in such a configuration, the path comprised of first transfer path 15, ignition chamber 13 and second transfer path 16 becomes complicated, so that the restraint effect can be achieved similarly to the above-noted gas generator 1A.

Figure 8A:
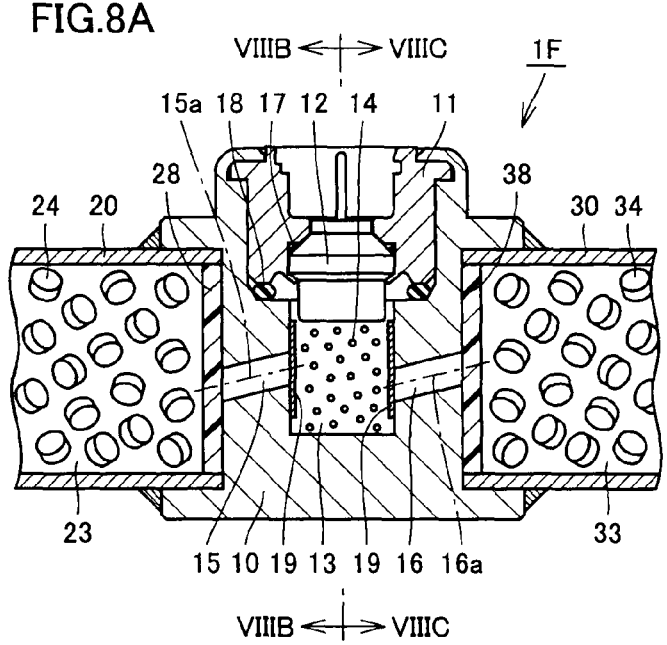
FIG. 8A is an enlarged cross-sectional view of a main part in a fifth modification of the gas generator in the first embodiment of the present invention.
Figure 8B:
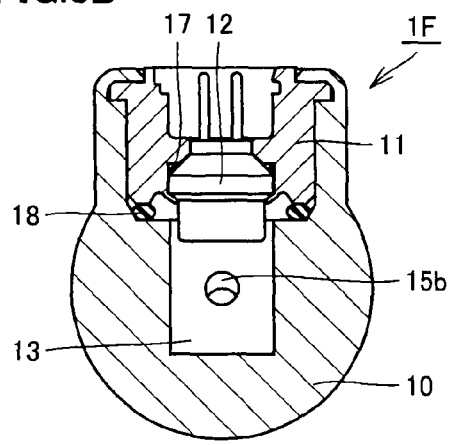
FIG. 8B is a cross-sectional view taken along line VIIIB-VIIIB in FIG. 8A.
Figure 8C:
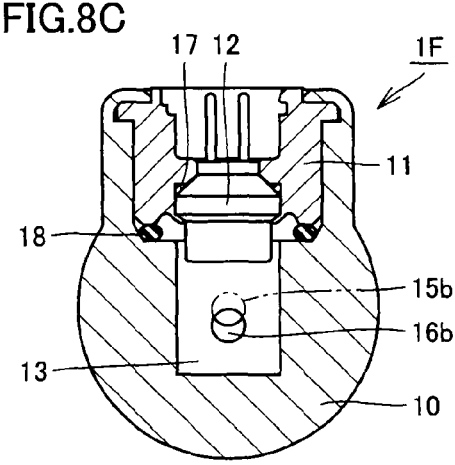
FIG. 8C is a cross-sectional view taken along line VIIIC-VIIIC in FIG. 8A.

FIG. 8A is an enlarged cross-sectional view of a main part of a gas generator in accordance with a fifth modification of the present embodiment, FIG. 8B is a cross-sectional view taken along line VIIIB-VIIIB in FIG. 8A, and FIG. 8C is a cross-sectional view taken along line VIIIC-VIIIC in FIG. 8A. It is noted that in FIG. 8B and FIG. 8C, the seal member affixed on the wall surface of the ignition chamber and the enhancer agent are not shown.

As shown in FIG. 8A to FIG. 8C, in a gas generator 1F in accordance with the fifth modification of the present embodiment, first transfer path 15 is formed of one hole drilled in base member 10 to extend linearly, and second transfer path 16 is formed of one hole drilled in base member 10 to extend linearly. Then, first transfer path 15 and second transfer path 16 are disposed to be displaced from each other in parallel such that center line 15a of the hole forming first transfer path 15 and center line 16a of the hole forming second transfer path 16 do not overlap on the same straight line. Here, in gas generator 1F in accordance with the present modification, first transfer path 15 and second transfer path 16 are provided obliquely in the same direction with respect to the axial line of the approximately cylindrical housing. Also in such a configuration, the path comprised of first transfer path 15, ignition chamber 13 and second transfer path 16 becomes complicated, so that the outstanding restraint effect can be achieved similarly to the above-noted gas generator 1A.

Figure 9A:
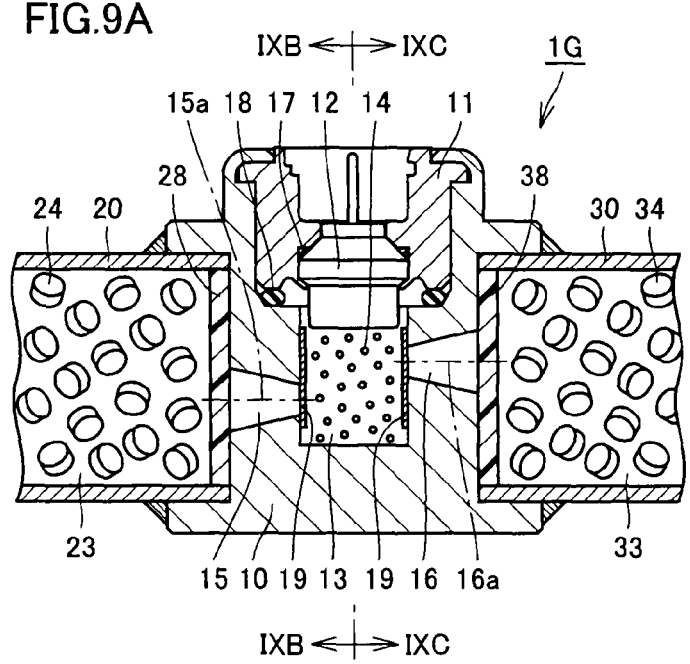
FIG. 9A is an enlarged cross-sectional view of a main part in a sixth modification of the gas generator in the first embodiment of the present invention.
Figure 9B:
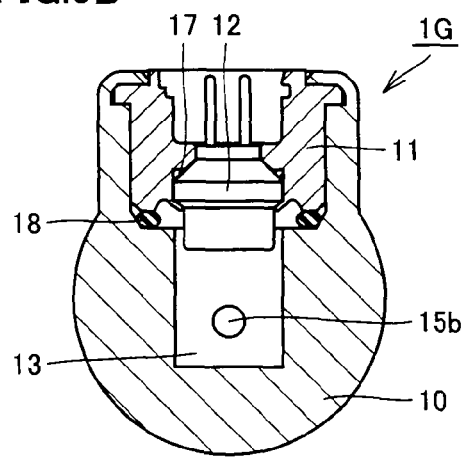
FIG. 9B is a cross-sectional view taken along line IXB-IXB in FIG. 9A.
Figure 9C:
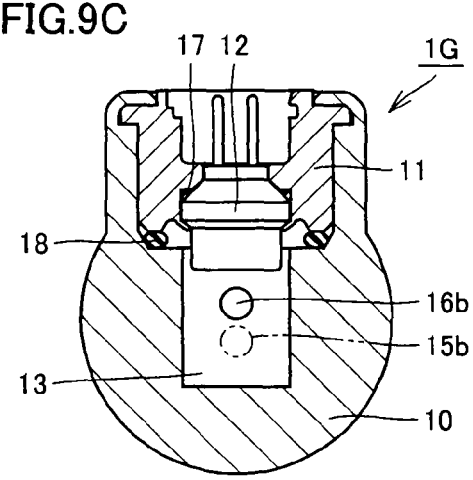
FIG. 9C is a cross-sectional view taken along line IXC-IXC in FIG. 9A.

FIG. 9A is an enlarged cross-sectional view of a main part of a gas generator in accordance with a sixth modification of the present embodiment, FIG. 9B is a cross-sectional view taken along line IXB-IXB in FIG. 9A, and FIG. 9C is a cross-sectional view taken along line IXC-IXC in FIG. 9A. It is noted that in FIG. 9B and FIG. 9C, the seal member affixed on the wall surface of the ignition chamber and the enhancer agent are not shown.

As shown in FIG. 9A to FIG. 9C, in a gas generator 1G in accordance with the sixth modification of the present embodiment, first transfer path 15 is formed of one hole drilled in base member 10 to extend in a tapered shape, and second transfer path 16 is formed of one hole drilled in base member 10 to extend in a tapered shape. Then, first transfer path 15 and second transfer path 16 are disposed to be displaced from each other in parallel such that center line 15a of the hole forming first transfer path 15 and center line 16a of the hole forming second transfer path 16 do not overlap on the same straight line. Also in such a configuration, the path comprised of first transfer path 15, ignition chamber 13 and second transfer path 16 becomes complicated, so that the restraint effect can be achieved similarly to the above-noted gas generator 1A.

Figure 10A:
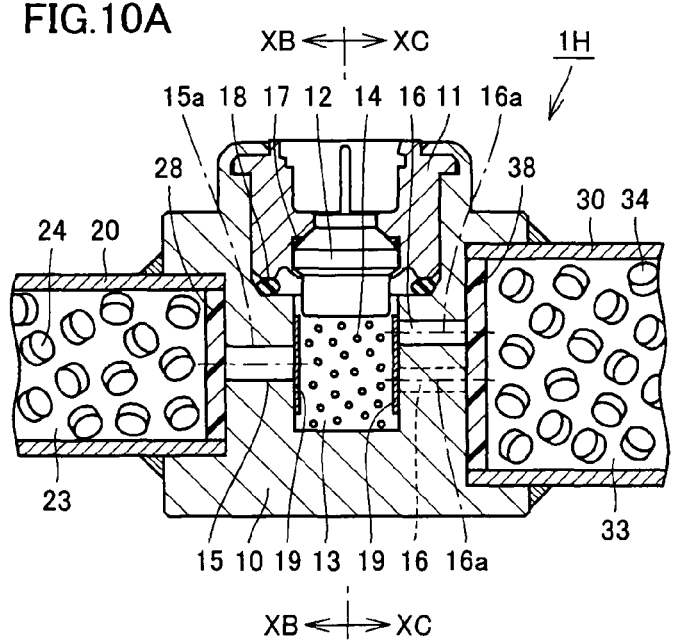
FIG. 10A is an enlarged cross-sectional view of a main part in a seventh modification of the gas generator in the first embodiment of the present invention.
Figure 10B:
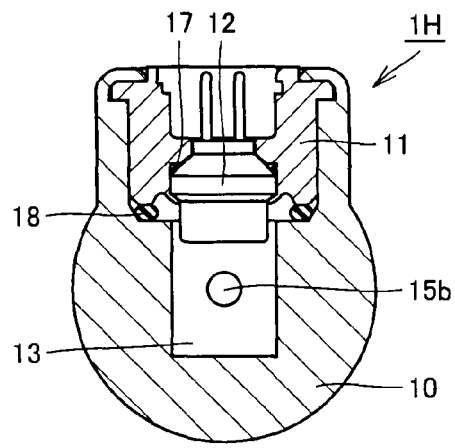
FIG. 10B is a cross-sectional view taken along line XB-XB in FIG. 10A.
Figure 10C:
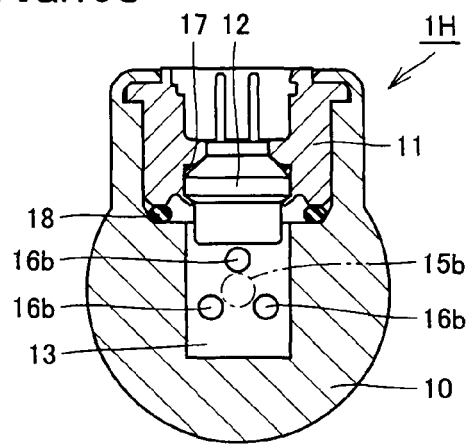
FIG. 10C is a cross-sectional view taken along line XC-XC in FIG. 10A.

FIG. 10A is an enlarged cross-sectional view of a main part of a gas generator in accordance with a seventh modification of the present embodiment, FIG. 10B is a cross-sectional view taken along line XB-XB in FIG. 10A, and FIG. 10C is a cross-sectional view taken along line XC-XC in FIG. 10A. It is noted that in FIG. 10B and FIG. 10C, the seal member affixed on the wall surface of the ignition chamber and the enhancer agent are not shown.

As shown in FIG. 10A to FIG. 10C, in a gas generator 1H in accordance with the seventh modification of the present embodiment, similar to gas generator 1A in the present embodiment as described above, first transfer path 15 is formed of one hole drilled in base member 10 to extend linearly, and second transfer path 16 is formed of three holes drilled in base member 10 to extend linearly. Then, first transfer path 15 and second transfer path 16 are arranged to be displaced from each other in parallel such that center line 15a of the hole forming first transfer path 15 and center line 16a of the hole forming second transfer path 16 do not overlap on the same straight line. Here, gas generator 1H in accordance with the present modification differs from gas generator 1A in the present embodiment as described above in that first cylindrical member 20 and second cylindrical member 30 have different inner diameters. Therefore, the packed amount of gas generating agents 24, 34 packed in first combustion chamber 23 and second combustion chamber 33 are also different. Also in such a configuration, the path comprised of first transfer path 15, ignition chamber 13 and second transfer path 16 becomes complicated, so that the outstanding restraint effect can be achieved similarly to the above-noted gas generator 1A.

Figure 11A:
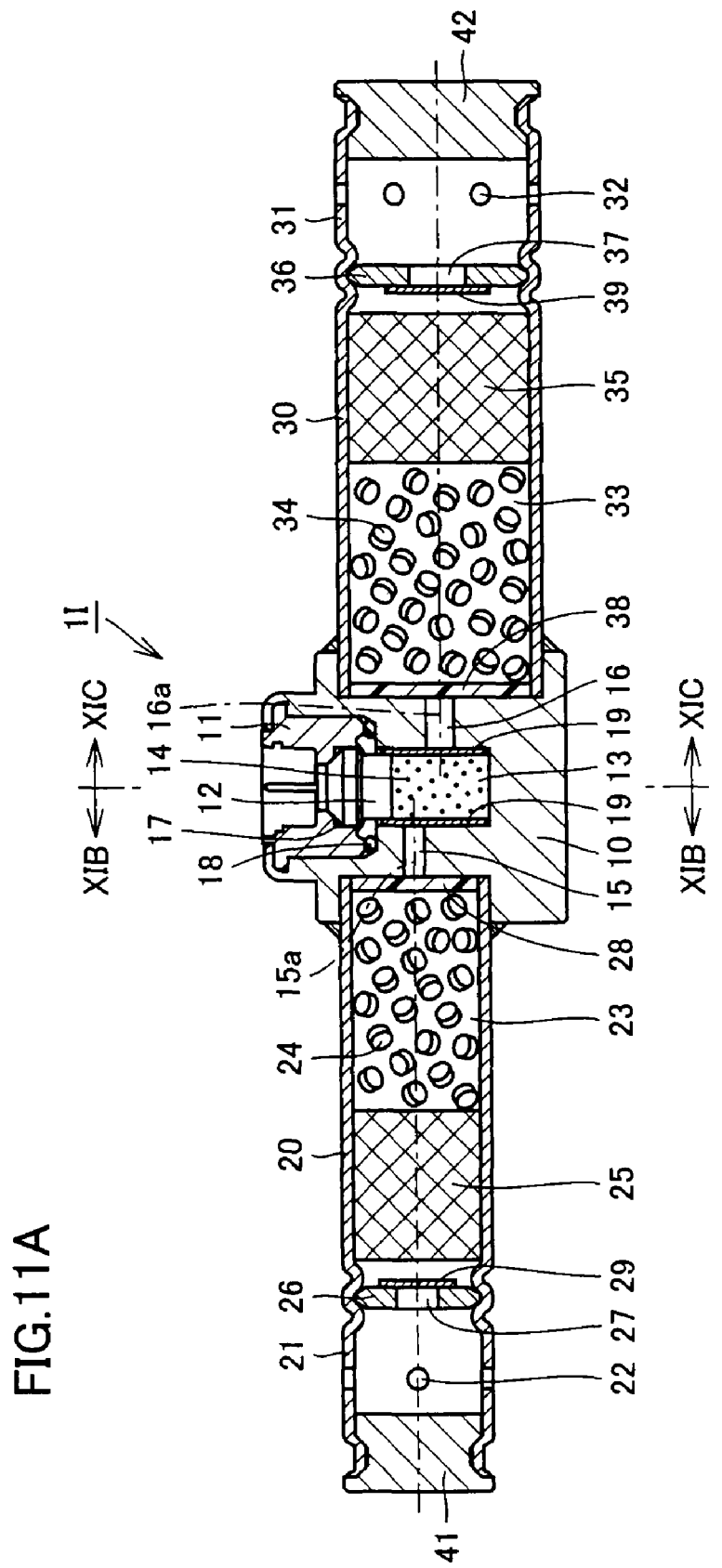
FIG. 11A is a cross-sectional view of an eighth modification of the gas generator in the first embodiment of the present invention.
Figure 11B:
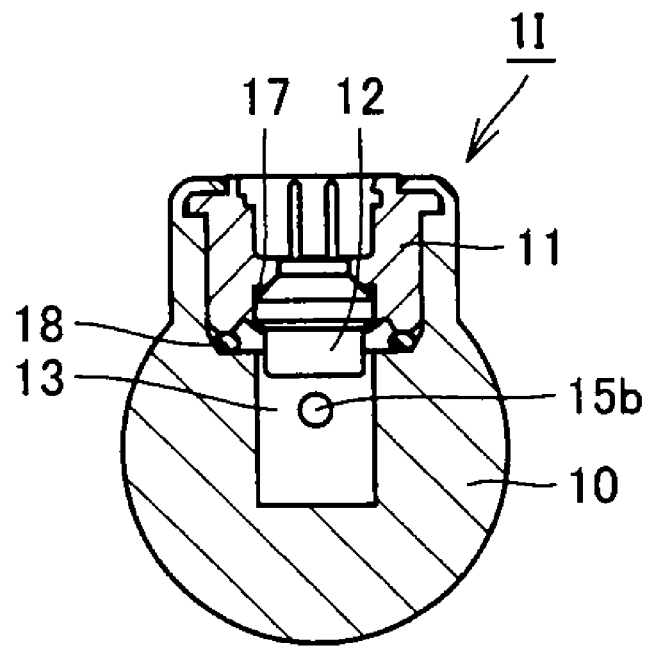
FIG. 11B is a cross-sectional view taken along line XIB-XIB in FIG. 11A.
Figure 11C:
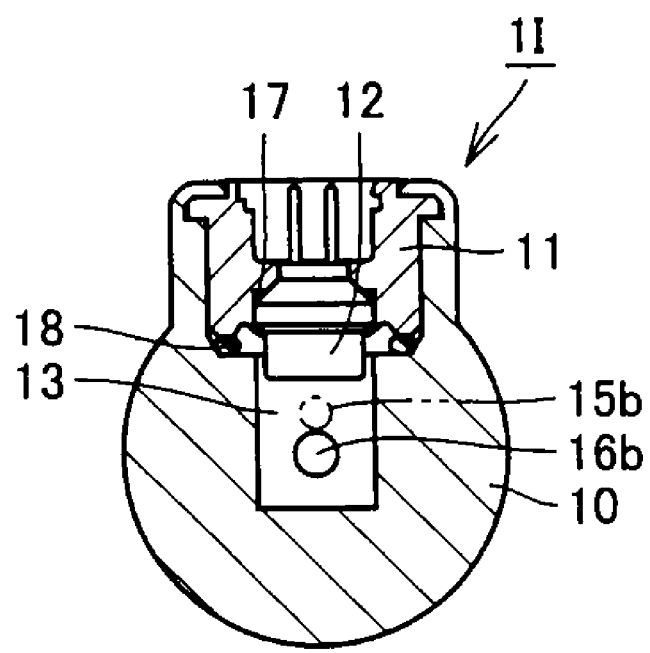
FIG. 11C is a cross-sectional view taken along line XIC-XIC in FIG. 11A.

FIG. 11A is a cross-sectional view of a gas generator in accordance with an eighth modification of the present embodiment, FIG. 11B is a cross-sectional view taken along line XIB-XIB in FIG. 11A, and FIG. 11C is a cross-sectional view taken along line XIC-XIC in FIG. 11A. It is noted that in FIG. 11B and FIG. 11C, the seal member affixed on the wall surface of the ignition chamber and the enhancer agent are not shown.

As shown in FIG. 11A to FIG. 11C, in a gas generator 1I in accordance with the eighth modification of the present embodiment, first transfer path 15 is formed of one hole drilled in base member 10 to extend linearly, and second transfer path 16 is formed of one hole drilled in base member 10 to extend linearly. In addition, in gas generator 1I in accordance with the present modification, similar to gas generator 1H in accordance with the seventh modification as described above, first cylindrical member 20 and second cylindrical member 30 have different inner diameters. Here, first transfer path 15 is disposed on the center axis of first cylindrical member 20, and second transfer path 16 is disposed on the center axis of second cylindrical member 30. Then, first cylindrical member 20 and second cylindrical member 30 having different inner diameters are arranged offset in the vertical direction in the figure such that their center axes do not overlap on the same straight line. As a result, first transfer path 15 and second transfer path 16 are arranged to be displaced from each other in parallel, and center line 15a of the hole forming first transfer path 15 and center line 16a of the hole forming second transfer path 16 do not overlap on the same straight line. Also in such a configuration, the path comprised of first transfer path 15, ignition chamber 13 and second transfer path 16 becomes complicated, so that the outstanding restraint effect can be achieved similarly to the above-noted gas generator 1A. It is noted that the offset direction and the offset amount are not particularly limited in the case where second cylindrical member 30 is offset with respect to first cylindrical member 20 and may be changed as appropriate depending on the specifications of the incorporated airbag apparatus, and the like.

As described above, the restraint effect can be obtained in most cases when the center line of the second transfer path does not overlap on the extended line of the center line of the first transfer path. Therefore, the shape, size and formation position of the first transfer path and the second transfer path, or the shape, size, formation position and the like of the first cylindrical member and the second cylindrical member may be changed as appropriate.

Second Embodiment

Figure 12A:
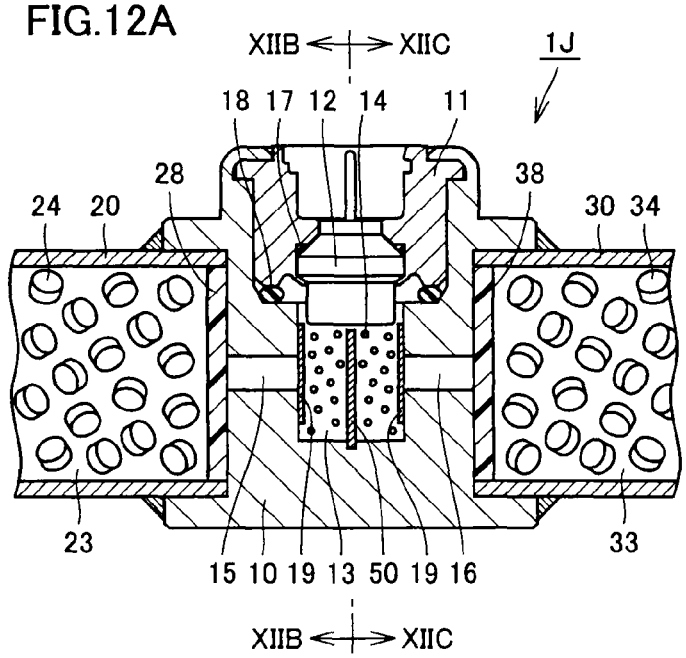
FIG. 12A is an enlarged cross-sectional view of a main part of a gas generator in a second embodiment of the present invention.
Figure 12B:
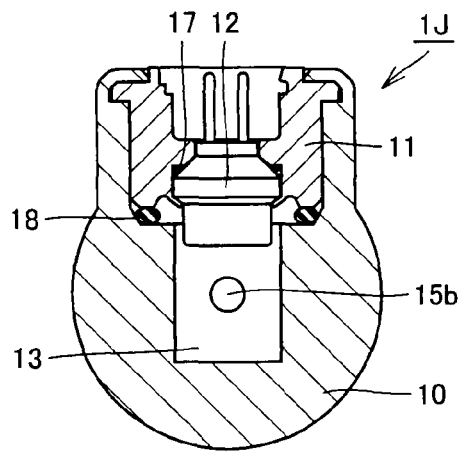
FIG. 12B is a cross-sectional view taken along line XIIB-XIIB in FIG. 12A.
Figure 12C:
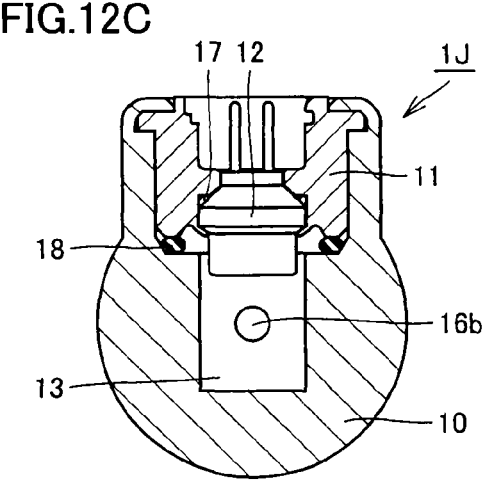
FIG. 12C is a cross-sectional view taken along line XIIC-XIIC in FIG. 12A.

FIG. 12A is an enlarged cross-sectional view of a main part of a gas generator in a second embodiment of the present invention, FIG. 12B is a cross-sectional view taken along line XIIB-XIIB in FIG. 12A, and FIG. 12C is a cross-sectional view taken along line XIIC-XIIC in FIG. 12A. In the following, a structure of a gas generator 1J in the present embodiment will be described with reference to the figures. It is noted that the portions similar to those of gas generator 1A in the first embodiment as described above are denoted with the same reference characters in the figures and description thereof will not be repeated here. Furthermore, in FIG. 12B and FIG. 12C, the seal member affixed on the wall surface of the ignition chamber, the enhancer agent, and a separation wall provided in the ignition chamber as described later are not shown.

As shown in FIG. 12A to FIG. 12C, in gas generator 1J in the present embodiment, first transfer path 15 communicating ignition chamber 13 with first combustion chamber 23 is formed of one hole drilled in base member 10 to extend linearly. Furthermore, second transfer path 16 communicating ignition chamber 13 with second combustion chamber 33 is formed of one hole filled in base member 10 to extend linearly. A separation wall 50 is provided as restraint means at a prescribed position of ignition chamber 13. This separation wall 50 is provided between opening face 15b of first transfer path 15 provided on the wall surface of ignition chamber 13 and opening face 16b of second transfer path 16 provided on the wall surface of ignition chamber 13 and separate these opening faces 15b, 16b from each other. In opposite spaces of ignition chamber 13 partitioned by separation wall 50, enhancer agent 14 is packed. Here, this separation wall 50 is formed of a member made of metal such as stainless steel, iron steel, aluminum alloy, or stainless alloy and is fixed to the wall surface of ignition chamber 13 by fitting, welding, or the like.

Because of such a configuration, opening face 15b of first transfer path 15 and opening face 16b of second transfer path 16 provided on the wall surface of ignition chamber 13 are separated from each other by separation wall 50, so that first transfer path 15 and second transfer path 16 can be substantially incommunicable with each other. Therefore, separation wall 50 functions as restraint means so that an effect of combustion of gas generating agent 24 stored in first combustion chamber 23 on combustion of gas generating agent 34 stored in second combustion chamber 33 is restrained in operation of gas generator 1J, that is, in a state where gas generating agents 24, 34 are fired by enhancer agent 14 ignited by igniter 12. Therefore, it becomes possible that the combustion characteristics of gas generating agent 24 in first combustion chamber 23 and the combustion characteristics of gas generating agent 34 in second combustion chamber 33 are substantially independent of each other, so that the intended combustion characteristics of gas generating agents 24, 34 in the respective combustion chambers 23, 33 can be obtained, and desired outputs can be obtained in respective gas output portions 21, 31.

As described above, in a case where uniform outputs in a pair of gas output portions are not desired, (for example, a case where respective airbags are mounted, independently one for each, for a pair of gas output portions and they are intended to expand at different expansion speeds, a case where internal pressure difference between the aforementioned pair of airbags is intended, or a case where a single airbag is mounted on both of a pair of gas output portions, and the duration of the expanded airbag is intended to be prolonged by adjusting the duration of the gas output at the pair of gas output portions), employment of the configuration of the gas generator as in the present embodiment prevents an effect of combustion of the gas generating agent in the first and second combustion chambers on combustion of the gas generating agent in the respective other combustion chamber, so that the desired performance can be obtained for the airbag apparatus as a whole.

Although, in gas generator 1J in the present embodiment, it has been described by way of example that opening face 15b of first transfer path 15 and opening face 16b of second transfer path 16 are completely shielded by separation wall 50, they are not necessarily completely shielded, and the restraint effect can be achieved to some extent when they are configured to be only partially shielded.

Third Embodiment

Figure 13:
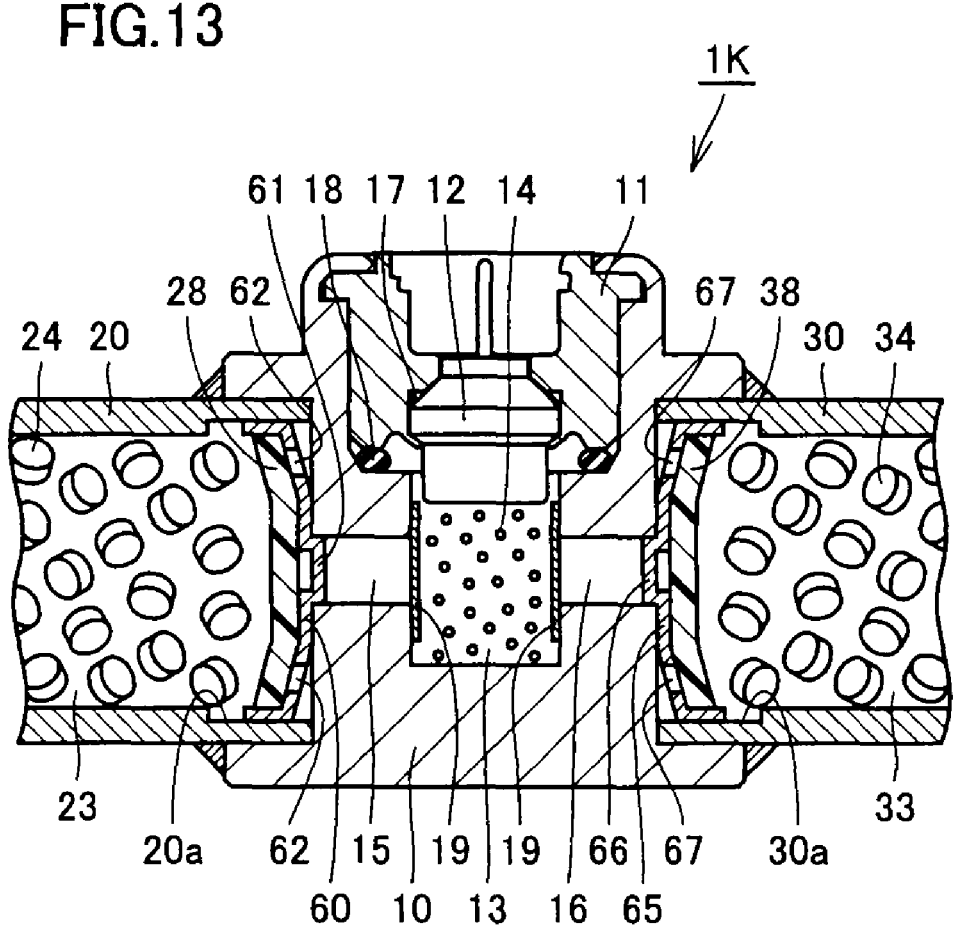
FIG. 13 is an enlarged cross-sectional view of a main part of a gas generator in a third embodiment of the present invention.

FIG. 13 is an enlarged cross-sectional view of a main part of a gas generator in a third embodiment of the present invention. In the following, a structure of a gas generator 1K in the present embodiment will be described with reference to this figure. It is noted that the portions similar to those of gas generator 1A in the first embodiment as described above are denoted with the same reference characters in the figure and description thereof will not be repeated here.

As shown in FIG. 13, in gas generator 1K in the present embodiment, transfer path 15 communicating ignition chamber 13 with first combustion chamber 23 is formed of one hole drilled in base member 10 to extend linearly. Second transfer path 16 communicating ignition chamber 13 with second combustion chamber 33 is formed of one hole drilled in base member 10 to extend linearly. Check valves 60, 65 are respectively provided adjacent to the wall surface on the ignition chamber 13 side in first combustion chamber 23 and second combustion chamber 33. Check valves 60, 65 respectively have outer shapes slightly larger than the inner diameters of first cylindrical member 20 and second cylindrical member 30, and are respectively fitted slidably in grooves 20a, 30a provided at the portions closer to ignition chamber 13 in first cylindrical member 20 and second cylindrical member 30.

At the middle portions of check valves 60, 65, protrusion portions 61, 66 protruding toward ignition chamber 13 are respectively provided, and these protrusion portions 61, 66 can respectively close first transfer path 15 and second transfer path 16 from the first combustion chamber 23 side and the second combustion chamber 33 side. In addition, the peripheral portions of check valves 60, 65 are respectively flexed toward the side opposite to the ignition chamber 13 side, and through-holes 62, 67 are respectively provided in these flex portions. These check valves 60, 65 are formed of metal, for example, such as stainless steel, iron steel, aluminum alloy or stainless alloy and have main surfaces positioned on the side opposite to the ignition chamber 13 side, to which cushion materials 28, 38 are respectively attached.

Figure 14A:
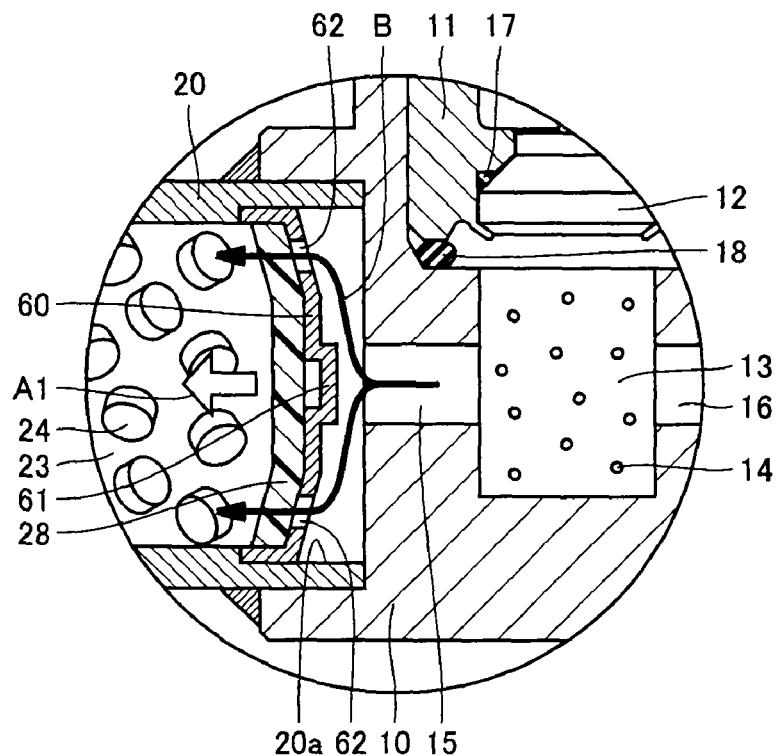
FIG. 14A is a view illustrating an operation of a check valve of the gas generator in the third embodiment of the present invention and is an enlarged cross-sectional view schematically showing a stage at which combustion of enhancer agent in an ignition chamber has started.
Figure 14B:
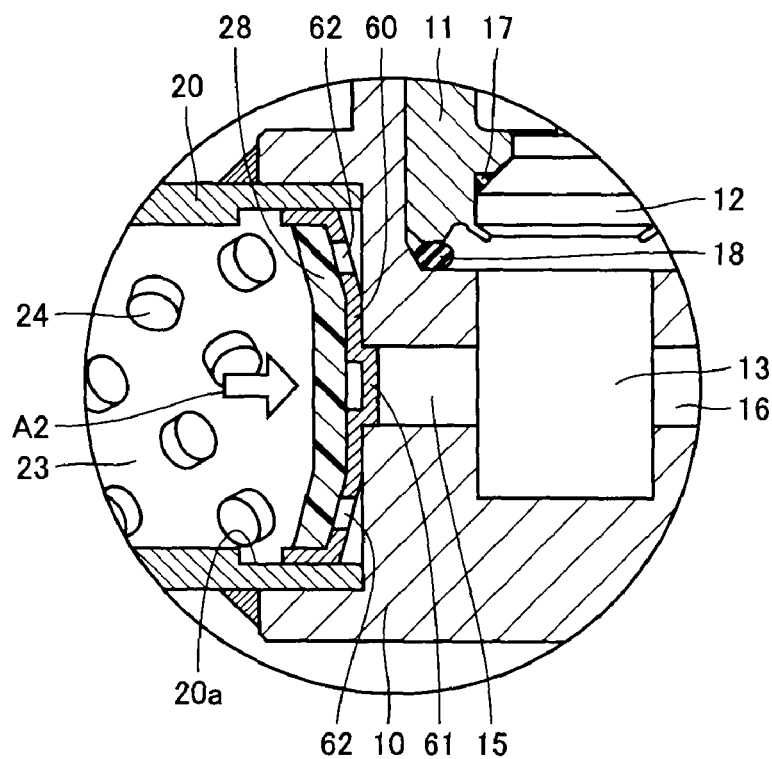
FIG. 14B is a view illustrating an operation of a check valve of the gas generator in the third embodiment of the present invention and is an enlarged cross-sectional view schematically showing a stage at which combustion of gas generating agent in a first ignition chamber has started.

FIG. 14A and FIG. 14B are views illustrating the operation of the check valve of the gas generator in the present embodiment. FIG. 14A is an enlarged cross-sectional view schematically showing a stage at which combustion of the enhancer agent in the ignition chamber has started, and FIG. 14B is an enlarged cross-sectional view schematically showing a stage at which combustion of the gas generating agent in the first combustion chamber has started. In the following, referring to these figures, the operation of check valve 60 in the case where the pressure in first combustion chamber 23 becomes higher than the pressure in second combustion chamber 33 will be described.

As shown in FIG. 14A, when igniter 12 is actuated and enhancer agent 14 stored in ignition chamber 13 starts burning, the pressure in ignition chamber 13 rises, which breaks off the sealing of seal member 19 so that ignition chamber 13 and first transfer path 15 are brought into communication with each other. Accordingly, the pressure in first transfer path 15 also rises, and check valve 60 is pushed in the direction of arrow A1 in the figure based on the pressure difference from first combustion chamber 23 so that the closeness by check valve 61 is released, causing gas to flow into the space, and bringing first transfer path 15 and first combustion chamber 23 into communication with each other through through-hole 62 provided to check valve 60. In this state, hot particles pass through first transfer path 15 and flow into first combustion chamber 23 along the direction of arrow B in the figure, so that gas generating agent 24 stored in first combustion chamber 23 is fired and burned to generate a large amount of gas. Here, similar to this, also on the second combustion chamber 33 side, check valve 65 is moved in response to actuation of igniter 12, and the closeness of second transfer path 16 by check valve 65 is released, so that combustion of gas generating agent 34 stored in second combustion chamber 33 starts.

The combustion of gas generating agent 24 as described above raises the pressure in first combustion chamber 23, and when the pressure in first combustion chamber 23 becomes higher than the pressure in first transfer path 15, as shown in FIG. 14B, check valve 60 is pushed back in the direction of arrow A2 in the figure based on the pressure difference from first transfer path 15, so that protrusion portion 61 of check valve 60 closes first transfer path 15, and first transfer path 15 and first combustion chamber 23 become incommunicable. After first transfer path 15 and first combustion chamber 23 become incommunicable with each other, gas generating agent 24 continues to burn as long as gas generating agent 24 stored in first combustion chamber 23 is left. Accordingly, the airbag inflates and expands.

Because of such a configuration, in the state in which gas generating agent 24 is burned in first combustion chamber 23, check valve 60 is driven, based on the pressure difference between first combustion chamber 23 and first transfer path 15 (that is, the pressure difference between first combustion chamber 23 and ignition chamber 13 or second combustion chamber 33), to slidably move and close first transfer path 15, so that first combustion chamber 23 and second combustion chamber 33 can be completely incommunicable with each other. Therefore, check valve 60 functions as restraint means, and in operation of gas generator 1K, that is, in the state where gas generating agents 24, 34 are fired by enhancer agent 14 ignited by igniter 12, an effect of combustion of gas generating agent 24 stored in first combustion chamber 23 on combustion of gas generating agent 34 stored in second combustion chamber 33 is restrained. Therefore, it becomes possible that the combustion characteristics of gas generating agent 24 in first combustion chamber 23 and the combustion characteristics of gas generating agent 34 in second combustion chamber 33 are substantially independent of each other, so that the intended combustion characteristics of gas generating agents 24, 34 in the respective combustion chambers 23, 33 can be obtained, and desired outputs can be obtained in respective gas output portions 21, 31.

Although, in gas generator 1K in the present embodiment, it has been described that similar check valve 65 is also provided on the second combustion chamber 33 side, as shown in FIG. 13, by way of example, installation of this check valve 65 on the second combustion chamber 33 side may be eliminated depending on situations. It may be eliminated when the rising speed of the internal pressure in first combustion chamber 23 is evidently higher than that of second combustion chamber 33, for example, in a case where uniform outputs in a pair of gas output portions are not desired, (for example, a case where respective airbags are mounted, independently one for each, for a pair of gas output portions and they are intended to expand at different expansion speeds, a case where internal pressure difference between the aforementioned pair of airbags is intended, or a case where a single airbag is mounted on both of a pair of gas output portions, and the duration of the expanded airbag is intended to be prolonged by adjusting the duration of the gas output at the pair of gas output portions). In other words, when it is unlikely that combustion of gas generating agent 34 in second combustion chamber 33 has an effect on combustion of gas generating agent 24 in first combustion chamber 23 through second transfer path 16, ignition chamber 13 and first transfer path 15 (when there is no chance that the pressure in second combustion chamber 33 becomes greater than the pressure in first combustion chamber 23), check valve 65 on the second combustion chamber 33 side can be eliminated.

As described above, in a case where uniform outputs in a pair of gas output portions are not desired, (for example, a case where respective airbags are mounted, independently one for each, for a pair of gas output portions and they are intended to expand at different expansion speeds, a case where internal pressure difference between the aforementioned pair of airbags is intended, or a case where a single airbag is mounted on both of a pair of gas output portions, and the duration of the expanded airbag is intended to be prolonged by adjusting the duration of the gas output at the pair of gas output portions), employment of the configuration of the gas generator as in the present embodiment prevents an effect of combustion of the gas generating agent in the first and second combustion chambers on combustion of the gas generating agent in the respective other combustion chamber, so that the desired performance can be obtained for the airbag apparatus as a whole.

Figure 15:
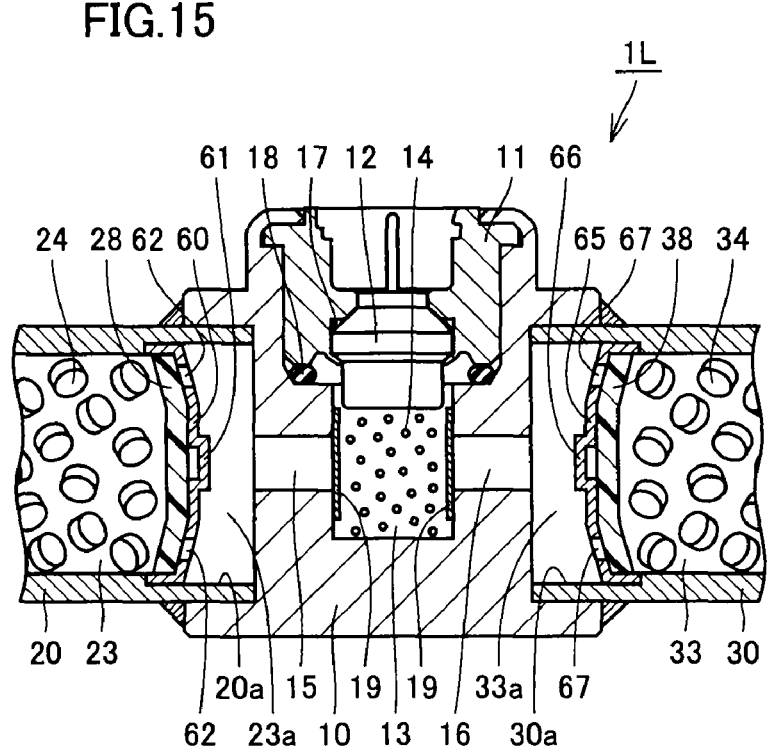
FIG. 15 is an enlarged cross-sectional view showing a main part of a modification to the gas generator in the third embodiment of the present invention.

FIG. 15 is an enlarged cross-sectional view showing a main part of a modification to the gas generator in the third embodiment of the present invention. In gas generator 1K in the present embodiment as described above, first transfer path 15 and second transfer path 16 are respectively closed by check valves 60, 65, before actuation of igniter 12. Usually, at a time when igniter 12 is actuated and enhancer agent 14 starts burning, the pressure in ignition chamber 13 greatly rises, and check valves 60, 65 are respectively pushed down toward combustion chambers 23, 33 in response to this pressure rise so that the combustion of gas generating agents 24, 34 is smoothly started. However, if gas generating agents 24, 34 are extremely densely packed or if the combustion ratio of enhancer agent 14 is relatively small, it is assumed that the operation of check valves 60, 65 is delayed and the start of combustion of gas generating agents 24, 34 is delayed. Then, a gas generator 1L in accordance with the present modification is configured, as shown in FIG. 15, such that first transfer path 15 and second transfer path 16 are not closed by check valves 60, 65 before actuation of igniter 12.

Specifically, as shown in FIG. 15, check valves 60, 65 are press fitted in grooves 20a, 30a provided in first cylindrical member 20 and second cylindrical member 30, and check valves 60, 65 are respectively fixed to first combustion chamber 23 on the side where gas generating agent 24 is stored and to second combustion chamber 33 on the side where gas generating agent 34 is stored, by friction between first cylindrical member 20 and second cylindrical member 30 and check valves 60, 65, so that spaces 23a, 33a are formed between check valves 60, 65 and base member 10. Accordingly, check valves 60, 65 are restrained from moving toward ignition chamber 13 by the aforementioned friction force, and therefore the openings of first transfer path 15 and second transfer path 16 provided on the wall surface of base member 10 are not closed by check valves 60, 65 before actuation of igniter 12. Therefore, as a result of combustion of enhancer agent 14 by actuation of igniter 12, hot particles immediately pass through first transfer path 15 and second transfer path 16, spaces 23a, 33a and through-holes 62, 67 provided to check valves 60, 65 to flow into combustion chambers 23, 33, respectively, so that combustion of gas generating agents 24, 34 is started smoothly.

Thereafter, when the pressure in first combustion chamber 23 or second combustion chamber 33 rises to a prescribed value or higher due to combustion of gas generating agents 24, 34, and when a pressure difference occurs between first combustion chamber 23 and second combustion chamber 33, the check valve for the combustion chamber under higher pressure moves toward ignition chamber 13 against the aforementioned friction force, whereby either first transfer path 15 or second transfer path 16 is closed by the check valve. Therefore, when the configuration as in the present modification is employed, it also becomes possible that the combustion characteristics of gas generating agent 24 in first combustion chamber 23 and the combustion characteristics of gas generating agent 34 in second combustion chamber 33 are substantially independent of each other, so that the intended combustion characteristics of the gas generating agents 24, 34 can be obtained in the respective combustion chambers 23, 33, and as a result, desired outputs can be obtained in the respective gas output portions 21, 31.

In gas generator 1L in accordance with the modification as described above, it has been illustrated that check valves 60, 65 are press fitted in grooves 20a, 30a provided in first cylindrical member 20 and second cylindrical member 30 whereby friction force produced therebetween restrains movement of check valves 60, 65 toward ignition chamber 13 before the operation of gas generator 1L. Instead, minute protrusions may be provided to grooves 20a, 30a and the engagement force between the minute protrusions and the check valves may restrain the movement of check valves 60, 65 toward ignition chamber 13 before the operation of the gas generator. In such a case, after the start of operation of the gas generator, the check valve for the combustion chamber under higher pressure goes over the minute protrusion against the engagement force by the aforementioned minute protrusion to move toward the ignition chamber, whereby either the first transfer path or the second transfer path is closed by the check valve.

Fourth Embodiment

Figure 16:
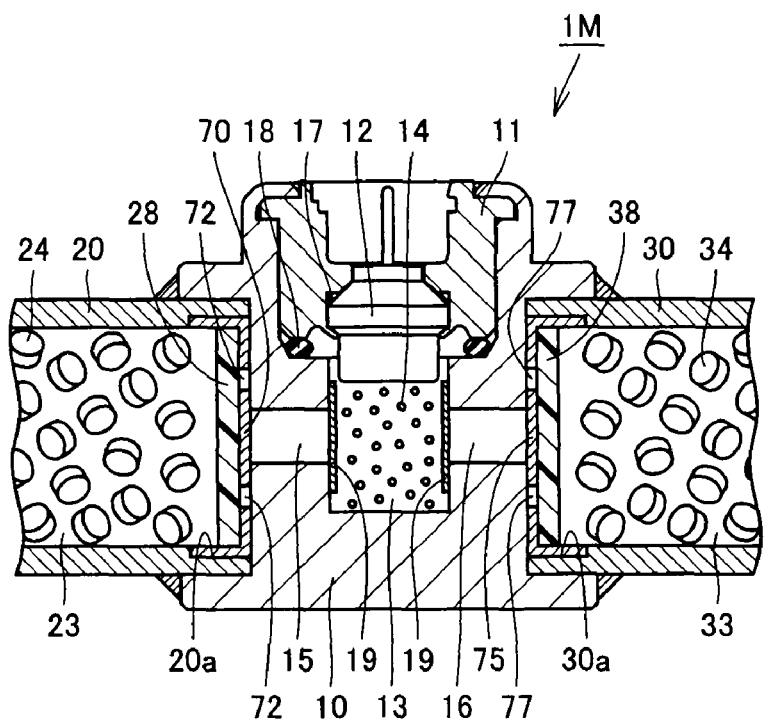
FIG. 16 is an enlarged cross-sectional view of a main part of a gas generator in a fourth embodiment of the present invention.

FIG. 16 is an enlarged cross-sectional view of a main part of a gas generator in a fourth embodiment of the present invention. In gas generators 1K, 1L in accordance with the third embodiment and the modification thereof as described above, it has been described by way of example that check valves 60, 65 configured such that valve bodies slidably move based on the pressure difference between first combustion chamber 23 and second combustion chamber 33 to fulfill the function as check valves are provided in first combustion chamber 23 and second combustion chamber 33. However, a check valve having a configuration different from this may be used. For example, one having a valve body deformed based on the pressure difference between first combustion chamber 23 and second combustion chamber 33 to function as a check valve may be used. A gas generator 1M in the present embodiment is an example of this case.

As shown in FIG. 16, in gas generator 1M in the present embodiment, check valves 70, 75 are respectively provided adjacent to the wall surface on the ignition chamber 13 side in first combustion chamber 23 and second combustion chamber 33. Check valves 70, 75 respectively have outer shapes slightly larger than the inner diameters of first cylindrical member 20 and second cylindrical member 30, and are respectively fitted and fixed in grooves 20a, 30a provided at the portions closer to ignition chamber 13 in first cylindrical member 20 and second cylindrical member 30.

The middle portions of check valves 70, 75 can respectively close first transfer path 15 and second transfer path 16 from the first combustion chamber 23 side and the second combustion chamber 33 side. Furthermore, through-hoes 72, 77 are respectively provided in the peripheral portions excluding the middle portions of check valves 70, 75. These check valves 70, 75 are formed of a metal, for example, such as stainless steel, iron steel, aluminum alloy, or stainless alloy, and cushion materials 28, 38 are respectively attached on the main surfaces positioned on the side opposite to the ignition chamber 13 side. Here, these check valves 70, 75 are formed to have reduced thickness and the parts forming the main surfaces thereof have appropriate flexibility.

Figure 17A:
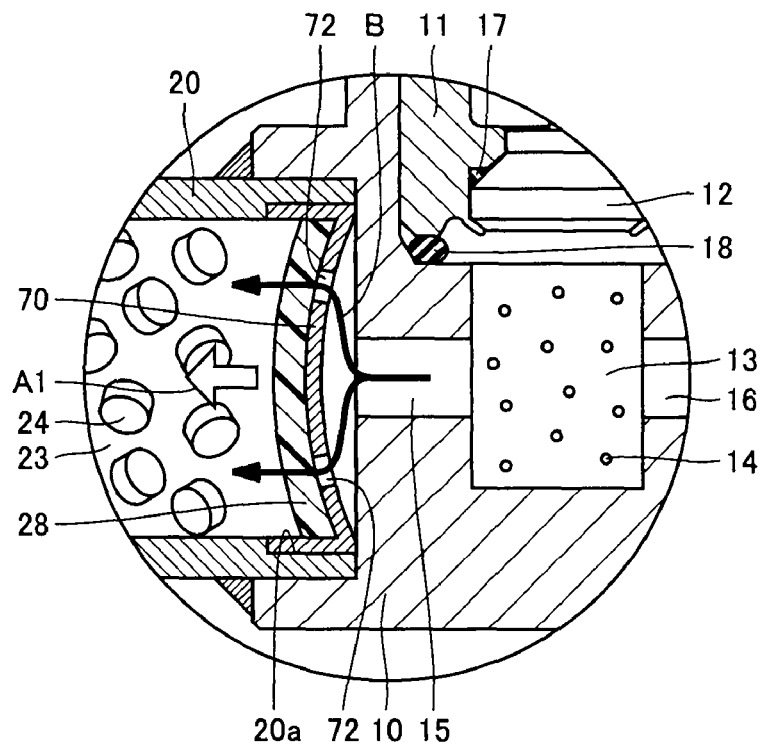
FIG. 17A is a view illustrating an operation of a check valve of the gas generator in the fourth embodiment of the present invention and is an enlarged cross-sectional view schematically showing a stage at which combustion of enhancer agent in the ignition chamber has started.
Figure 17B:
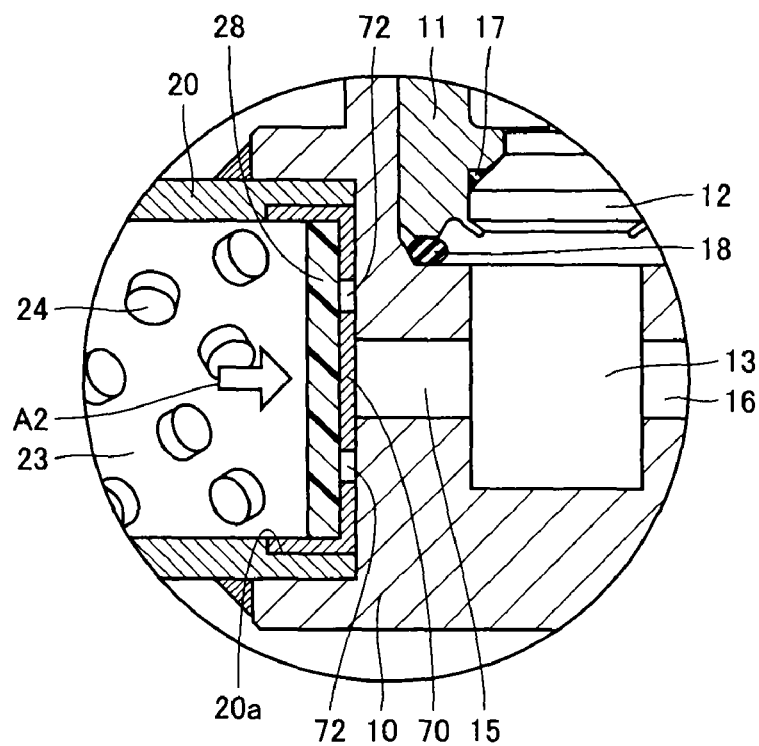
FIG. 17B is a view illustrating an operation of a check valve of the gas generator in the fourth embodiment of the present invention and is an enlarged cross-sectional view schematically showing a stage at which combustion of gas generating agent in the first ignition chamber has started.

FIG. 17A and FIG. 17B are views illustrating the operation of the check valve of the gas generator in the present embodiment. FIG. 17A is an enlarged cross-sectional view schematically showing a stage at which combustion of the enhancer agent in the ignition chamber has started, and FIG. 17B is an enlarged cross-sectional view schematically showing a stage at which combustion of the gas generating agent in the first combustion chamber has started. In the following, referring to these figures, the operation of check valve 70 in the case where the pressure in first combustion chamber 23 becomes higher than the pressure in second combustion chamber 33 will be described.

As shown in FIG. 17A, when igniter 12 is actuated and enhancer agent 14 stored in ignition chamber 13 starts burning, the pressure in ignition chamber 13 rises, which breaks off the sealing of seal member 19 so that ignition chamber 13 and first transfer path 15 are brought into communication with each other. Accordingly, the pressure in first transfer path 15 also rises, and check valve 70 is flexed in the direction of arrow A1 in the figure based on the pressure difference from first combustion chamber 23 whereby first transfer path 15 and first combustion chamber 23 are brought into communication with each other through through-hole 72 provided to check valve 70. In this state, hot particles pass through first transfer path 15 and flow into first combustion chamber 23 along the direction of arrow B in the figure, so that gas generating agent 24 stored in first combustion chamber 23 is fired and burned to generate a large amount of gas. Here, similar to this, also on the second combustion chamber 33 side, check valve 75 is moved in response to actuation of igniter 12, and the closeness of second transfer path 16 by check valve 75 is released, so that combustion of gas generating agent 34 stored in second combustion chamber 33 starts.

The combustion of gas generating agent 24 as described above raises the pressure in first combustion chamber 23, and when the pressure in first combustion chamber 23 becomes higher than the pressure in first transfer path 15, as shown in FIG. 17B, the flexed part of check valve 70 is pushed back in the direction of arrow A2 in the figure based on the pressure difference from first transfer path 15, so that check valve 70 closes first transfer path 15, and first transfer path 15 and first combustion chamber 23 become incommunicable. After first transfer path 15 and first combustion chamber 23 become incommunicable with each other, gas generating agent 24 continues to burn as long as gas generating agent 24 stored in first combustion chamber 23 is left. Accordingly, the airbag inflates and expands.

Because of such a configuration, in the state in which gas generating agent 24 is burned in first combustion chamber 23, check valve 70 is driven and deformed, based on the pressure difference between first combustion chamber 23 and first transfer path 15 (that is, the pressure difference between first combustion chamber 23 and ignition chamber 13 or second combustion chamber 33), to close first transfer path 15, so that first combustion chamber 23 and second combustion chamber 33 can be completely incommunicable with each other. Therefore, check valve 70 functions as restraint means, and the similar effect to that of gas generator 1K in the third embodiment as described above can be obtained.

As described above, in a case where uniform outputs in a pair of gas output portions are not desired, (for example, a case where respective airbags are mounted, independently one for each, for a pair of gas output portions and they are intended to expand at different expansion speeds, a case where internal pressure difference between the aforementioned pair of airbags is intended, or a case where a single airbag is mounted on both of a pair of gas output portions, and the duration of the expanded airbag is intended to be prolonged by adjusting the duration of the gas output at the pair of gas output portions), employment of the configuration of the gas generator as in the present embodiment prevents a large effect of combustion of the gas generating agent in the first and second combustion chambers on combustion of the gas generating agent in the respective other combustion chamber, so that the desired performance can be obtained for the airbag apparatus as a whole.

Figure 18:
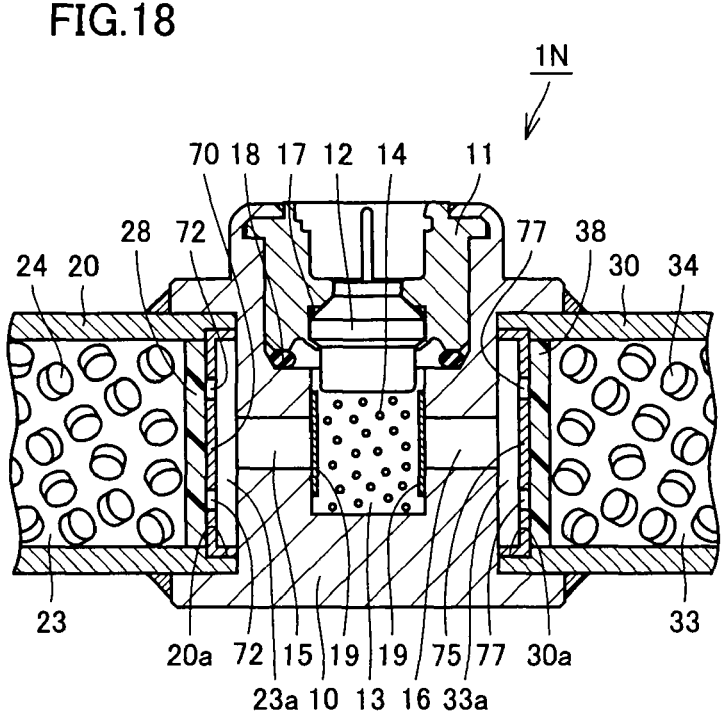
FIG. 18 is an enlarged cross-sectional view showing a main part of a modification to the gas generator in the fourth embodiment of the present invention.
Figure 19:
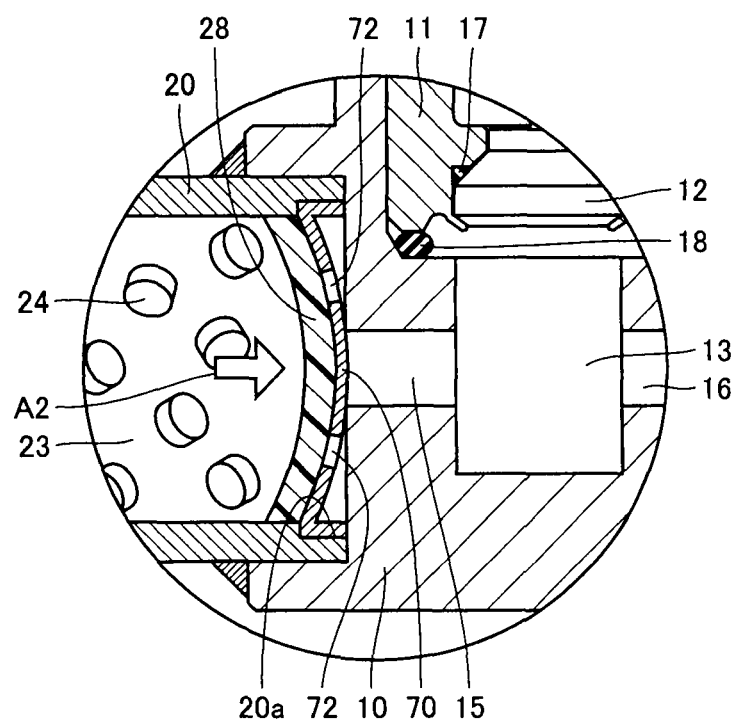
FIG. 19 is a view illustrating an operation of a check valve in the modification to the gas generator in the fourth embodiment of the present invention and is an enlarged cross-sectional view schematically showing a stage at which combustion of gas generating agent in the first ignition chamber has started.

FIG. 18 is an enlarged cross-sectional view showing a main part of a modification to the gas generator in the fourth embodiment of the present invention. Furthermore, FIG. 19 is a view illustrating an operation of the check valve in the gas generator in accordance with the present modification and is an enlarged cross-sectional view schematically showing a stage at which combustion of the gas generating agent in the first combustion chamber has started. In gas generator 1M in the present embodiment as described above, first transfer path 15 and second transfer path 16 are respectively closed by check valves 70, 75 before actuation of igniter 12. However, as described in the foregoing third embodiment, it is assumed that the operation of check valves 70, 75 is delayed and the start of combustion of gas generating agents 24, 34 is delayed in the case where gas generating agents 24, 34 are extremely densely packed or where the combustion ratio of enhancer agent 14 is relatively small. Then, a gas generator 1N in accordance with the present modification is configured, as shown in FIG. 18, such that first transfer path 15 and second transfer path 16 are not closed by check valves 70, 75 before actuation of igniter 12.

Specifically, as shown in FIG. 18, check valves 70, 75 are fitted in grooves 20a, 30a provided in first cylindrical member 20 and second cylindrical member 30 such that spaces 23a, 33a are respectively formed between the main surfaces of check valves 70, 75 and the wall surface of base member 10. As a result, the openings of first transfer path 15 and second transfer path 16 provided on the wall surface of base member 10 are not closed by check valves 70, 75 before actuation of igniter 12. Therefore, as a result of combustion of enhancer agent 14 by actuation of igniter 12, hot particles immediately pass through first transfer path 15 and second transfer path 16, spaces 23a, 33a, and through-holes 72, 77 provided to check valves 70, 75, respectively, to flow into combustion chambers 23, 33 so that the combustion of gas generating agents 24, 34 is started smoothly.

Thereafter, when a pressure difference occurs between first combustion chamber 23 and second combustion chamber 33 due to combustion of gas generating agents 24, 34, the middle portion of the check valve for the combustion chamber under higher pressure moves toward ignition chamber 13 (in the direction of arrow A2 in the figure), whereby either first transfer path 15 or second transfer path 16 is closed by the check valve. Here, FIG. 19 shows the shape of check valve 70 in the case where the pressure in first combustion chamber 23 becomes higher than the pressure in second combustion chamber 33, and in this state, the opening of first transfer path 15 provided on the wall surface of base member 10 is closed by the middle portion of the deformed check valve 70. Accordingly, it becomes possible that the combustion characteristics of gas generating agent 24 in first combustion chamber 23 and the combustion characteristics of gas generating agent 34 in second combustion chamber 33 are substantially independent of each other, so that the intended combustion characteristics of gas generating agents 24, 34 can be obtained in respective combustion chambers 23, 33, and desired outputs can be obtained in respective gas output portions 21, 31.

Fifth Embodiment

Figure 20A:
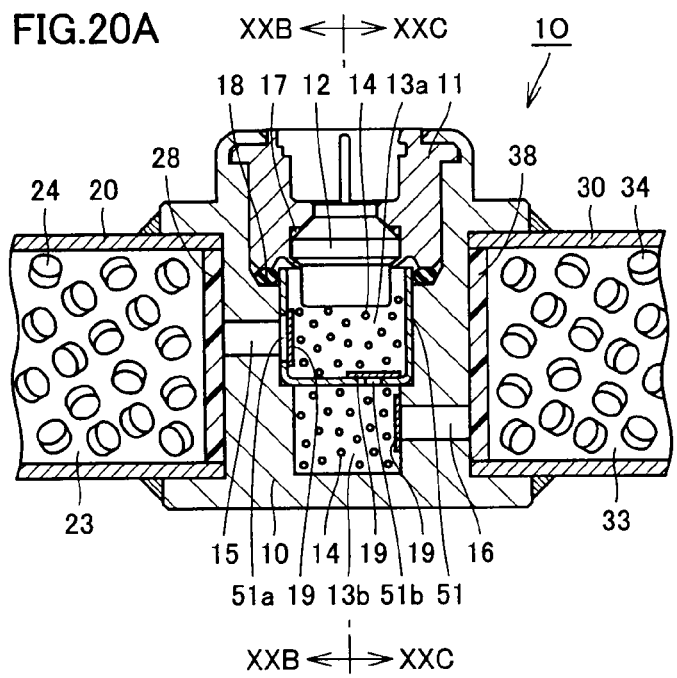
FIG. 20A is an enlarged cross-sectional view of a main part of a gas generator in a fifth embodiment of the present invention.
Figure 20B:
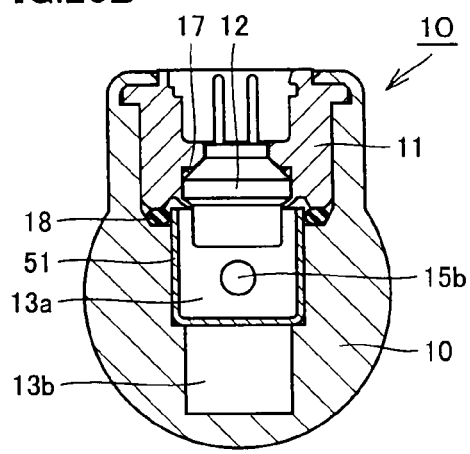
FIG. 20B is a cross-sectional view taken along line XXB-XXB in FIG. 20A.
Figure 20C:
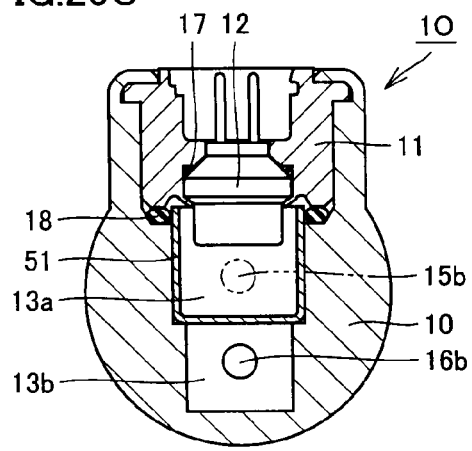
FIG. 20C is a cross-sectional view taken along line XXC-XXC in FIG. 20A.

FIG. 20A is an enlarged cross-sectional view of a main part of a gas generator in a fifth embodiment of the present invention, FIG. 20B is a cross-sectional view taken along line XXB-XXB in FIG. 20A, and FIG. 20C is a cross-sectional view taken along line XXC-XXC in FIG. 20A. In the following, a structure of a gas generator 1O in the present embodiment will be described with reference to the figures. It is noted that the portions similar to those of gas generator 1A in the first embodiment as described above are denoted with the same reference characters in the figures and description thereof will not be repeated here. Furthermore, in FIG. 20B and FIG. 20C, the seal member affixed on the wall surface of the ignition chamber and the enhancer agent are not shown.

As shown in FIG. 20A to FIG. 20C, in gas generator 1O in the present embodiment, a stepped portion is provided on a side surface of a depression portion of base member 10 defining an ignition chamber, and a cup member 51 is fitted in the depression portion to abut on this stepped portion, whereby the ignition chamber is partitioned into two chambers along the axial direction of igniter 12 (the axial length of the squib cup of igniter 12 formed in the shape of a cylinder with a bottom part in which an ignition charge is packed). Then, first transfer path 15 is formed by drilling one hole extending linearly from a side surface of a first ignition chamber 13a positioned on the igniter 12 side of the ignition chamber partitioned in two chambers, toward first combustion chamber 23, and second transfer path 16 is formed by drilling one hole extending linearly from a side surface of a second ignition chamber 13b not positioned on the igniter 12 side toward second combustion chamber 33.

A cylindrical cup with a bottom part, made of a metal, for example, such as stainless steel, iron steel, aluminum alloy, or stainless alloy is used as cup member 51. Suitably, cup member 51 is press fitted into the aforementioned depression portion to be fixed to base member 10. On the side surface and the bottom surface of cup member 51, an opening portion 51a and an opening portion 51b are respectively formed, and seal members 19 are affixed from the inside of cup member 51 to respectively close opening portion 51a and opening portion 51b. When fitted into the aforementioned depression portion, cup member 51 is positioned and arranged so that the aforementioned opening portion 51a faces opening face 15b of first transfer path 15. In addition, seal member 19 is affixed to opening face 16b of second transfer path 16 provided on the side surface of second ignition chamber 13b to close opening face 16b. Here, enhancer agent 14 is packed in each of first ignition chamber 13a and second ignition chamber 13b.

Because of such a configuration, when opening face 15b of first transfer path 15 provided on the wall surface of the ignition chamber is projected onto the wall surface of the ignition chamber on which opening face 16b of second transfer path 16 is provided, along the center line of first transfer path 15, the projected opening face 15b of first transfer path 15 does not overlap with opening face 16b of second transfer path 16 (see, in particular, FIG. 20C). In addition, the ignition chamber is partitioned by the bottom surface of cup member 51 as a separation wall into first ignition chamber 13a and second ignition chamber 13b, and opening face 15b of first transfer path 15 is separated from opening face 16b of second transfer path 16 by the bottom surface of cup member 51. Therefore, the path comprised of first transfer path 15, first ignition chamber 13a, second ignition chamber 13b, and second transfer path 16 positioned between first combustion chamber 23 and second combustion chamber 33 becomes complicated.

Therefore, such disposition of first transfer path 15 and second transfer path 16 functions as restraint means per se, and the bottom surface of cup member 51 as a separation wall also functions as restraint means, so that in operation of gas generator 1O, that is, in the state where gas generating agents 24, 34 are fired by enhancer agent 14 ignited by igniter 12, an effect of the combustion of gas generating agent 24 stored in first combustion chamber 23 on the combustion of gas generating agent 34 stored in second combustion chamber 33 is restrained. More specifically, when a pressure difference occurs between first combustion chamber 23 and second combustion chamber 33, a backflow of generated gas caused by a pressure rise in first combustion chamber 23 produced by combustion of gas generating agent 24 in first combustion chamber 23 is prevented, and the resultant movement of hot particles from first combustion chamber 23 to second combustion chamber 33 is prevented. Therefore, it becomes possible that the combustion characteristics of gas generating agent 24 in first combustion chamber 23 and the combustion characteristics of gas generating agent 34 in second combustion chamber 33 are substantially independent of each other, so that the intended combustion characteristics of gas generating agents 24, 34 in respective combustion chambers 23, 33 can be obtained, and desired outputs can be obtained in respective gas output portions 21, 31.

As described above, in a case where uniform outputs in a pair of gas output portions are not desired, (for example, a case where respective airbags are mounted, independently one for each, for a pair of gas output portions and they are intended to expand at different expansion speeds, a case where internal pressure difference between the aforementioned pair of airbags is intended, or a case where a single airbag is mounted on both of a pair of gas output portions, and the duration of the expanded airbag is intended to be prolonged by adjusting the duration of the gas output at the pair of gas output portions), employment of the configuration of the gas generator as in the present embodiment eliminates an effect of combustion of the gas generating agent in the first and second combustion chambers on combustion of the gas generating agent in the respective other combustion chamber, so that the desired performance can be obtained for the airbag apparatus as a whole.

Since such a configuration in that cup member 51 is press fitted and fixed in base member 10 is employed in gas generator 1O in the present embodiment as described above, a separation wall is easily provided in the ignition chamber. In addition, with employment of the configuration as in the present embodiment, the degree of the restraint effect can be adjusted easily by adjusting the size of opening portion 51b provided on the bottom surface of cup member 51, as appropriate.

Sixth Embodiment

Figure 21:
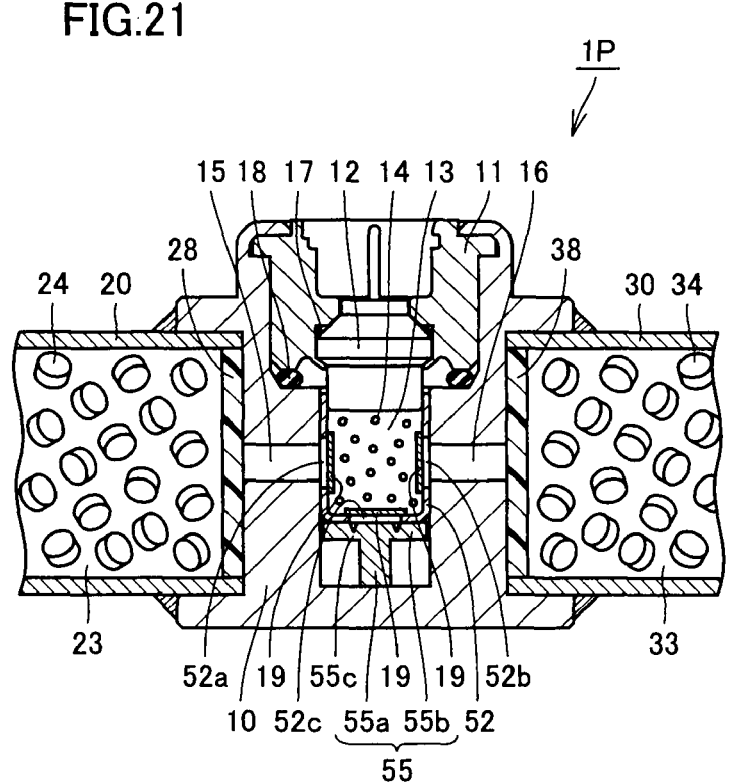
FIG. 21 is an enlarged cross-sectional view of a main part before actuation of a gas generator in a sixth embodiment of the present invention.
Figure 22:
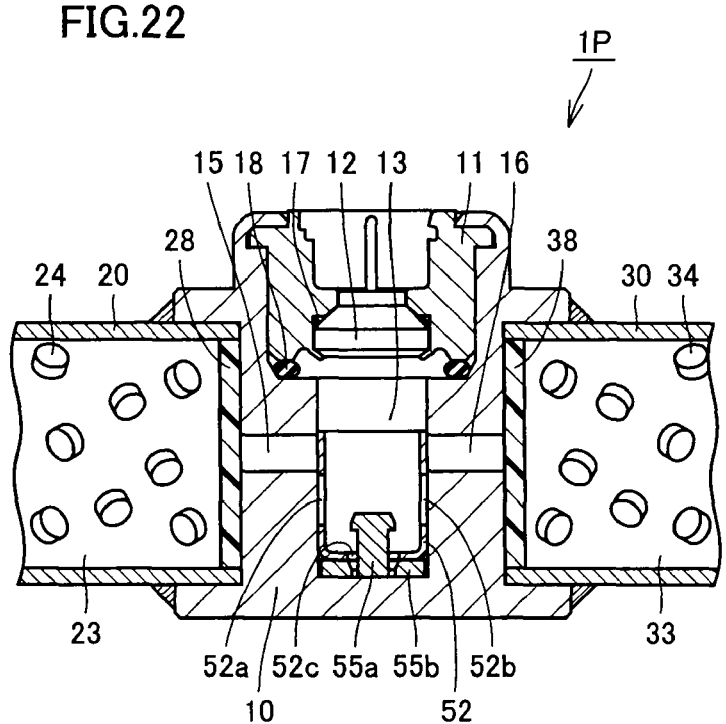
FIG. 22 is an enlarged cross-sectional view of a main part after actuation of the gas generator in the sixth embodiment of the present invention.
Figure 23:
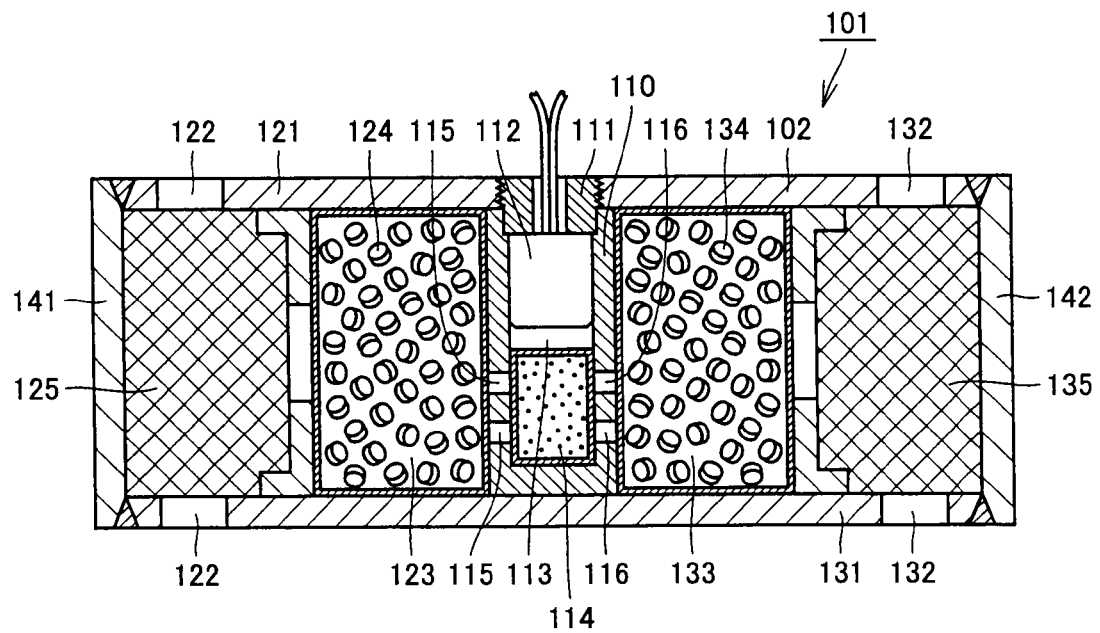
FIG. 23 is a schematic cross-sectional view showing an exemplary conventional gas generator.

FIG. 21 and FIG. 22 are enlarged cross-sectional views of a main part of a gas generator in a sixth embodiment of the present invention, where FIG. 21 is an enlarged cross-sectional view of the main part before actuation and FIG. 22 is an enlarged cross-sectional view of the main part after actuation. In the following, a structure and an operation of a gas generator 1P in the present embodiment will be described with reference to the figures. It is noted that the portions similar to those of gas generator 1A in the first embodiment as described above are denoted with the same reference characters in the figures and description thereof will not be repeated here.

As shown in FIG. 21, in gas generator 1P in the present embodiment, a cup member 52 as a movable member and a pin 55 as a movement restriction member are arranged in the depression portion of base member 10 defining ignition chamber 13. A cylindrical cup with a bottom part, made of a metal, for example, such as stainless steel, iron steel, aluminum alloy, or stainless alloy is used as cup member 52. On the other hand, a member, for example, made of resin is used as pin 55. Cup member 52 has opening portions 52a, 52b at prescribed positions of the side wall thereof and has an opening portion 52c at the middle portion of the bottom surface thereof. Pin 55 has a strut portion 55a and a flange portion 55b provided at one end of this strut portion 55a. Pin 55 is inserted and arranged in the aforementioned depression portion such that the tip end of strut portion 55a is in abutment with the bottom surface of the aforementioned depression portion provided in base member 10, and cup member 52 is inserted and arranged in the aforementioned depression portion such that the bottom surface thereof is in abutment with flange portion 55b of pin 55 inserted and arranged in the aforementioned depression portion. Here, cup member 52 is not completely fixed to base member 10 and inserted inside thereof with prescribed friction force. Therefore, application of a force greater than the aforementioned friction force allows cup member 52 to move in the aforementioned depression portion.

As shown in FIG. 21, before the operation of gas generator 1P, cup member 52 is positioned and arranged in the aforementioned depression portion such that opening portion 52a of cup member 52 faces the opening face of first transfer path 15 provided to base member 10 and opening portion 52b of cup member 52 faces the opening face of second transfer path 16 provided to base member 10. In this state, seal members 19 are affixed to cup member 51 to respectively close opening portions 52a-52c. Then, enhancer agent 14 is packed in the internal space of cup member 52. Here, the opening diameter of opening portion 52c formed in the bottom surface of cup member 52 is formed to be larger than the outer diameter of strut portion 55a of pin 55. In addition, a thin fragile portion 55c is formed at the base member of flange portion 55b of pin 55 by forming a cut or the like.

When igniter 12 is actuated and enhancer agent 14 stored in ignition chamber 13 starts burning, the pressure in ignition chamber 13 rises, which breaks off seal members 19 closing opening portions 52a, 52b of cup member 52 so that ignition chamber 13 and first combustion chamber 23 and second combustion chamber 33 communicate with each other. Accordingly, combustion of gas generating agents 24, 34 in first combustion chamber 23 and second combustion chamber 33 starts. When combustion of gas generating agents 24, 23 starts, the pressure in first combustion chamber 23 and in second combustion chamber 33 rapidly rises, and part of the pressure raises the pressure in ignition chamber 13 through first transfer path 15 and second transfer path 16. As a result, the pressure in ignition chamber 13 becomes even higher than immediately after the actuation of igniter 12, and cup member 51 is pressurized toward pin 55. The pressurizing force at this point is applied to fragile portion 55c of pin 55, so that pin 55 is broken off at fragile portion 55c and split into strut portion 55a and flange portion 55b. Then, cup member 52 moves toward pin 55 against the aforementioned friction force, and seal member 19 closing opening portion 52c is also broken, resulting in the state as shown in FIG. 22.

Through the operation as described above, the movement of cup member 52 causes the opening face of first transfer path 15 and the opening face of second transfer path 16 to be closed by the side wall of cup member 52. After ignition chamber 13 and first combustion chamber 23 and second combustion chamber 33 become incommunicable with each other, gas generating agents 24, 34 continue to burn as long as gas generating agents 24, 34 stored in first combustion chamber 23 and second combustion chamber 33 are left, and the airbag inflates and expands, accordingly.

Because of such a configuration, in the state where gas generating agents 24, 34 are burned in first combustion chamber 23 and second combustion chamber 33, cup member 52 is driven by the pressure produced in ignition chamber 13 to slidably move against the restriction of movement of pin 55 so that the opening face of first transfer path 15 and the opening face of second transfer path 16 are closed, thereby making first combustion chamber 23 and second combustion chamber 33 incommunicable with each other. Therefore, cup member 52 and pin 55 function as restraint means, so that in the operation of gas generator 1P, that is, in the state where gas generating agents 24, 34 are fired by enhancer agent 14 ignited by igniter 12, an effect of combustion of gas generating agent 24 stored in first combustion chamber 23 on the combustion of gas generating agent 34 stored in second combustion chamber 33 is restrained. Therefore, it becomes possible that the combustion characteristics of gas generating agent 24 in first combustion chamber 23 and the combustion characteristics of gas generating agent 34 in second combustion chamber 33 are substantially independent of each other, so that the intended combustion characteristics of gas generating agents 24, 34 in respective combustion chambers 23, 33 can be obtained, and desired outputs can be obtained in respective gas output portions 21, 31.

As described above, in a case where uniform outputs in a pair of gas output portions are not desired, (for example, a case where respective airbags are mounted, independently one for each, for a pair of gas output portions and they are intended to expand at different expansion speeds, a case where internal pressure difference between the aforementioned pair of airbags is intended, or a case where a single airbag is mounted on both of a pair of gas output portions, and the duration of the expanded airbag is intended to be prolonged by adjusting the duration of the gas output at the pair of gas output portions), employment of the configuration of the gas generator as in the present embodiment eliminates a large effect of combustion of the gas generating agent in the first and second combustion chambers on combustion of the gas generating agent in the respective other combustion chamber, so that the desired performance can be obtained for the airbag apparatus as a whole.

It is noted that, in order to obtain the restraint effect with employment of the configuration as in the present embodiment, it is important that cup member 52 as a movable member starts moving at a prescribed timing against the restriction of movement by pin 55 as a movement restriction member. In order to adjust the timing, it is necessary to adjust the material of pin 55, the mechanical strength of fragile portion 55c, the gas outputs of gas generating agents 24, 34, the friction force between cup member 52 and base member 10, and the like, as appropriate.

In the first to sixth embodiments as described above, the description has been made by way of example to the case where the present invention is applied to a so-called T-shaped gas generator having an approximately cylindrical housing with opposite ends closed and discharging gas from the opposite end portions. However, the present invention may be applied to any gas generator as long as it has two or more gas output portions driven by one igniter. Therefore, the present invention may be applied to gas generators with a variety of configurations, other than the T-shaped gas generator as described above.

Furthermore, although, in the first to sixth embodiments as described above, a gas generator in which a gas generating agent and a filter member are arranged in a combustion chamber has been described by way of example, a gas generator may not always be configured in this manner, and a gas generator may be configured such that a partition plate is arranged between a gas generating agent and a filter member and that a combustion chamber in which a gas generating agent is stored and a filter chamber in which a filter member is stored are separately provided. In this case, it is preferable that a filter member is formed like a hollow cylinder and a gas discharge opening is provided on the peripheral wall of a cylindrical member defining a filter chamber.

Moreover, although, in the first to sixth embodiments as described above, a gas generator configured such that an igniter and an enhancer agent are separately stored in an ignition chamber has been described by way of example, such a configuration may be employed in that not only an ignition charge but also an enhancer agent is packed inside the igniter. Also in this case, the present invention may be applied, as a matter of course.

It is noted that the characteristic configurations shown in the embodiments above can be combined with each other, as a matter of course.

In this manner, the foregoing embodiments as disclosed herein are illustrative and not limitative in all respects. The technical scope of the present invention is defined by the claims and equivalencies to the claims and all modifications within the claims are embraced herein.

The invention claimed is:

1. A gas generator comprising:
an ignition chamber having a single igniter and an enhancer agent stored therein;
a first combustion chamber and a second combustion chamber each having a gas generating agent stored therein;
a first transfer path communicating said ignition chamber with said first combustion chamber; and
a second transfer path communicating said ignition chamber with said second combustion chamber,
said ignition chamber, said first combustion chamber and said second combustion chamber are provided inside an elongated housing,
said ignition chamber, said first combustion chamber and said second combustion chamber are arranged linearly in an axial direction of said elongated housing such that said ignition chamber is sandwiched between said first combustion chamber and said second combustion chamber, and
said first transfer path and said second transfer path are arranged to be displaced from each other in parallel such that a center line of said first transfer path and a center line of said second transfer path do not overlap on a same straight line.

2. A gas generator comprising:
an ignition chamber having a single igniter and an enhancer agent stored therein;
a first combustion chamber and a second combustion chamber each having a gas generating agent stored therein;
a first transfer path communicating said ignition chamber with said first combustion chamber; and
a second transfer path communicating said ignition chamber with said second combustion chamber,
said ignition chamber, said first combustion chamber and said second combustion chamber are provided inside an elongated housing,
said ignition chamber, said first combustion chamber and said second combustion chamber are arranged linearly in an axial direction of said elongated housing such that said ignition chamber is sandwiched between said first combustion chamber and said second combustion chamber, and
wherein said first transfer path and said second transfer path are arranged to be displaced from each other such that a center line of said first transfer path and a center line of said second transfer path are non-parallel.

3. A gas generator comprising:
an ignition chamber having a single igniter and an enhancer agent stored therein;
a first combustion chamber and a second combustion chamber each having a gas generating agent stored therein;
a first transfer path communicating said ignition chamber with said first combustion chamber; and
a second transfer path communicating said ignition chamber with said second combustion chamber,
said ignition chamber, said first combustion chamber and said second combustion chamber are provided inside an elongated housing,
said ignition chamber, said first combustion chamber and said second combustion chamber are arranged linearly in an axial direction of said elongated housing such that said ignition chamber is sandwiched between said first combustion chamber and said second combustion chamber, and
wherein said first transfer path and said second transfer path are arranged to be displaced from each other such that when an opening face of said first transfer path provided on a wall surface of said ignition chamber is projected onto a wall surface of said ignition chamber on which an opening face of said second transfer path is provided, along a center line of said first transfer path, the projected opening face of said first transfer path does not overlap with the opening face of said second transfer path.

4. A gas generator comprising:
an ignition chamber having a single igniter and an enhancer agent stored therein;
a first combustion chamber and a second combustion chamber each having a gas generating agent stored therein;
a first transfer path communicating said ignition chamber with said first combustion chamber; and
a second transfer path communicating said ignition chamber with said second combustion chamber,
said ignition chamber, said first combustion chamber and said second combustion chamber are provided inside an elongated housing,
said ignition chamber, said first combustion chamber and said second combustion chamber are arranged linearly in an axial direction of said elongated housing such that said ignition chamber is sandwiched between said first combustion chamber and said second combustion chamber, and
wherein said first transfer path and said second transfer path are arranged to be displaced in an axial length of said igniter such that when an opening face of said first transfer path provided on a wall surface of said ignition chamber is projected onto a wall surface of said ignition chamber on which an opening face of said second transfer path is provided, along a center line of said first transfer path, the projected opening face of said first transfer path does not overlap with the opening face of said second transfer path; and said ignition chamber is partitioned in the axial length of said igniter into two chambers by providing a separation wall between the opening face of said first transfer path provided on the wall surface of the ignition chamber and the opening face of said second transfer path provided on the wall surface of said ignition chamber.

5. The gas generator according to claim 4, wherein said separation wall is formed of a part of a cylindrical cup with a bottom part arranged in said ignition chamber.

6. The gas generator according to claim 5, wherein said cup member is press fitted and fixed in said ignition chamber.

7. The gas generator according to claim 1, further comprising a separation wall provided between an opening face of said first transfer path provided on a wall surface of said ignition chamber and an opening face of said second transfer path provided on a wall surface of said ignition chamber.

8. The gas generator according to claim 1, further comprising a check valve which is disposed at a position that allows said first transfer path to be closed and which is driven based on a pressure difference between said first combustion chamber and said second combustion chamber.

9. A gas generator comprising:
an ignition chamber having a single igniter and an enhancer agent stored therein;
a first combustion chamber and a second combustion chamber each having a gas generating agent stored therein;
a first transfer path communicating said ignition chamber with said first combustion chamber;
a second transfer path communicating said ignition chamber with said second combustion chamber; and
a movable member movably arranged in said ignition chamber and a movement restriction member arranged in said ignition chamber and being in abutment with said movable member for restricting movement of said movable member,
wherein said movable member is moved against restriction of movement by said movement restriction member by a pressure produced in said ignition chamber, whereby at least one of an opening face of said first transfer path provided on a wall surface of said ignition chamber and an opening face of said second transfer path provided on a wall surface of said ignition chamber is closed by said movable member.

10. The gas generator according to claim 9, wherein said movable member is formed of a cylindrical cup with a bottom part arranged in said ignition chamber.

11. The gas generator according to claim 9, wherein said movement restriction member has a fragile portion broken off with a movement of said movable member.

12. The gas generator according to claim 2, further comprising a separation wall provided between an opening face of said first transfer path provided on a wall surface of said ignition chamber and an opening face of said second transfer path provided on a wall surface of said ignition chamber.

13. The gas generator according to claim 2, further comprising a check valve which is disposed at a position that allows said first transfer path to be closed and which is driven based on a pressure difference between said first combustion chamber and said second combustion chamber.

14. The gas generator according to claim 3, further comprising a separation wall provided between an opening face of said first transfer path provided on a wall surface of said ignition chamber and an opening face of said second transfer path provided on a wall surface of said ignition chamber.

15. The gas generator according to claim 3, further comprising a check valve which is disposed at a position that allows said first transfer path to be closed and which is driven based on a pressure difference between said first combustion chamber and said second combustion chamber.

16. The gas generator according to claim 4, further comprising a check valve which is disposed at a position that allows said first transfer path to be closed and which is driven based on a pressure difference between said first combustion chamber and said second combustion chamber.

* * * * *